US012000562B2

(12) United States Patent
Danesh

(10) Patent No.: US 12,000,562 B2
(45) **Date of Patent: *Jun. 4, 2024**

(54) LIGHTING ASSEMBLY WITH AC TO DC CONVERTER AND HEAT-SINKING HOUSING

(71) Applicant: DMF, Inc., Carson, CA (US)

(72) Inventor: Michael D. Danesh, Carson, CA (US)

(73) Assignee: DMF, Inc., Carson, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/826,847

(22) Filed: May 27, 2022

(65) Prior Publication Data

US 2023/0280006 A1 Sep. 7, 2023

Related U.S. Application Data

(63) Continuation of application No. 17/395,522, filed on Aug. 6, 2021, now abandoned, which is a (Continued)

(51) Int. Cl.

*F21S 8/02* (2006.01)
*F21V 7/04* (2006.01)
(Continued)

(52) U.S. Cl.

CPC ................ *F21S 8/02* (2013.01); *F21S 8/026* (2013.01); *F21V 7/041* (2013.01); *F21V 23/006* (2013.01);
(Continued)

(58) Field of Classification Search

CPC .. F21S 8/02; F21S 8/026; F21V 7/041; F21V 23/006; H04R 17/00; H04R 23/02; H04R 1/24; H04R 2499/11; F21Y 2115/10
See application file for complete search history.

(56) References Cited

U.S. PATENT DOCUMENTS

| | | | |
|---|---|---|---|
| 1,133,535 A | 3/1915 | Cain et al. | |
| 1,471,340 A | 10/1923 | Knight | |

(Continued)

FOREIGN PATENT DOCUMENTS

| | | |
|---|---|---|
| CA | 2243934 C | 6/2002 |
| CA | 2502637 A1 | 9/2005 |

(Continued)

OTHER PUBLICATIONS

Non-Final Office Action dated Oct. 5, 2023 from U.S. Appl. No. 17/328,214, 12 Pages.

(Continued)

*Primary Examiner* — Tsion Tumebo
(74) *Attorney, Agent, or Firm* — Smith Baluch LLP

(57) ABSTRACT

A lighting assembly includes a heat-sinking housing, a lens, a light source module including at least one LED, and an AC to DC converter to receive an AC voltage and supply regulated electrical energy to power the light source module. The housing includes a closed rear wall and a sidewall that defines a housing cavity containing the at least one LED. The closed rear wall and the sidewall are formed of a heat conductive material to conduct heat generated by the light source module. The assembly has a front end face, and at least one exterior width dimension of less than 3½ inches. In one example, a circular recess defined along an inner edge of the front end face contains the lens in the assembly. In another example, the front face includes a tool-less mating mechanism, for example a twist-and-lock mechanism comprising multiple flanges and/or slots.

10 Claims, 3 Drawing Sheets

Related U.S. Application Data continuation of application No. 17/080,080, filed on Oct. 26, 2020, now Pat. No. 11,085,597, which is a continuation of application No. 16/522,275, filed on Jul. 25, 2019, now Pat. No. 10,816,148, which is a continuation of application No. 15/947,065, filed on Apr. 6, 2018, now Pat. No. 10,408,395, which is a continuation of application No. 14/184,601, filed on Feb. 19, 2014, now Pat. No. 9,964,266.

(60) Provisional application No. 61/843,278, filed on Jul. 5, 2013.

(51) Int. Cl.

| | |
|---|---|
| ***F21V 23/00*** | (2015.01) |
| ***F21Y 115/10*** | (2016.01) |
| ***H04R 17/00*** | (2006.01) |
| ***H04R 23/02*** | (2006.01) |
| *H04R 1/24* | (2006.01) |

(52) U.S. Cl.

CPC ............ *H04R 17/00* (2013.01); *H04R 23/02* (2013.01); *F21Y 2115/10* (2016.08); *H04R 1/24* (2013.01); *H04R 2499/11* (2013.01)

(56) References Cited

U.S. PATENT DOCUMENTS

| | | | | |
|---|---|---|---|---|
| 1,856,356 | A | 5/1932 | Owen | |
| 2,038,784 | A | 4/1936 | Ghadiali | |
| 2,179,161 | A | 11/1939 | Rambusch | |
| 2,197,737 | A | 4/1940 | Appleton | |
| 2,352,913 | A | 7/1944 | Morrill | |
| 2,528,989 | A | 11/1950 | Ammells | |
| 2,597,595 | A | 5/1952 | Ordas | |
| 2,642,246 | A | 6/1953 | Larry | |
| 2,670,919 | A | 3/1954 | Vincent | |
| 2,697,535 | A | 12/1954 | Olson | |
| 2,758,810 | A | 8/1956 | Good | |
| D180,844 | S | 8/1957 | Poliakoff | |
| 2,802,933 | A | 8/1957 | Broadwin | |
| 2,998,512 | A | 8/1961 | Duchene et al. | |
| 3,023,920 | A | 3/1962 | Cook et al. | |
| 3,057,993 | A | 10/1962 | Gellert | |
| 3,104,087 | A | 9/1963 | Joseph et al. | |
| 3,214,126 | A | 10/1965 | Roos | |
| 3,422,261 | A | 1/1969 | McGinty | |
| 3,460,299 | A | 8/1969 | Wilson | |
| 3,650,046 | A | 3/1972 | Skinner | |
| 3,675,807 | A | 7/1972 | Lund et al. | |
| 3,700,885 | A | 10/1972 | Bobrick | |
| 3,711,053 | A | 1/1973 | Drake | |
| D227,989 | S | 7/1973 | Geisel | |
| 3,773,968 | A | 11/1973 | Copp | |
| 3,812,342 | A | 5/1974 | Mcnamara | |
| 3,836,766 | A | 9/1974 | Auerbach | |
| 3,874,035 | A | 4/1975 | Schuplin | |
| 3,913,773 | A | 10/1975 | Copp et al. | |
| D245,905 | S | 9/1977 | Taylor | |
| 4,088,827 | A | 5/1978 | Kohaut | |
| 4,176,758 | A | 12/1979 | Glick | |
| 4,280,169 | A | 7/1981 | Allen | |
| 4,399,497 | A | 8/1983 | Druffel | |
| 4,450,512 | A | 5/1984 | Kristofek | |
| 4,460,948 | A | 7/1984 | Malola | |
| 4,520,435 | A | 5/1985 | Baldwin | |
| 4,539,629 | A | 9/1985 | Poppenheimer | |
| 4,601,145 | A | 7/1986 | Wilcox | |
| 4,667,840 | A | 5/1987 | Lindsey | |
| 4,723,747 | A | 2/1988 | Karp et al. | |
| 4,729,080 | A | 3/1988 | Fremont et al. | |
| 4,733,339 | A | 3/1988 | Kelsall | |
| 4,754,377 | A | 6/1988 | Wenman | |
| 4,770,311 | A | 9/1988 | Wang | |
| 4,880,128 | A | 11/1989 | Jorgensen | |
| 4,910,651 | A | 3/1990 | Montanez | |
| 4,919,292 | A | 4/1990 | Hsu | |
| 4,929,187 | A | 5/1990 | Hudson et al. | |
| 4,930,054 | A | 5/1990 | Krebs | |
| D326,537 | S | 5/1992 | Gattari | |
| 5,216,203 | A | 6/1993 | Gower | |
| 5,222,800 | A | 6/1993 | Chan et al. | |
| 5,239,132 | A | 8/1993 | Bartow | |
| 5,250,269 | A | 10/1993 | Langer et al. | |
| 5,266,050 | A | 11/1993 | O'Neil et al. | |
| 5,291,381 | A | 3/1994 | Price | |
| 5,303,894 | A | 4/1994 | Deschamps et al. | |
| 5,382,752 | A | 1/1995 | Reyhan et al. | |
| 5,420,376 | A | 5/1995 | Rajecki et al. | |
| 5,465,199 | A | 11/1995 | Bray et al. | |
| D365,165 | S | 12/1995 | Stultz | |
| 5,505,419 | A | 4/1996 | Gabrius | |
| 5,544,870 | A | 8/1996 | Kelley et al. | |
| 5,562,343 | A | 10/1996 | Chan et al. | |
| 5,571,993 | A | 11/1996 | Jones et al. | |
| 5,580,158 | A | 12/1996 | Aubrey et al. | |
| 5,588,737 | A | 12/1996 | Kusmer | |
| 5,603,424 | A | 2/1997 | Bordwell et al. | |
| 5,609,408 | A | 3/1997 | Targetti | |
| 5,613,338 | A | 3/1997 | Esposito | |
| D381,111 | S | 7/1997 | Lecluze | |
| 5,662,413 | A | 9/1997 | Akiyama et al. | |
| D386,277 | S | 11/1997 | Lecluze | |
| 5,690,423 | A | 11/1997 | Hentz et al. | |
| D387,466 | S | 12/1997 | Lecluze | |
| 5,738,436 | A | 4/1998 | Cummings et al. | |
| 5,778,625 | A | 7/1998 | Druffel et al. | |
| 5,836,678 | A | 11/1998 | Wright et al. | |
| 5,942,726 | A | 8/1999 | Reiker | |
| 5,944,412 | A | 8/1999 | Janos et al. | |
| 5,957,573 | A | 9/1999 | Wedekind et al. | |
| 5,975,323 | A | 11/1999 | Turan | |
| 6,030,102 | A | 2/2000 | Gromotka | |
| 6,082,878 | A | 7/2000 | Doubek et al. | |
| 6,095,669 | A | 8/2000 | Cho | |
| 6,098,945 | A | 8/2000 | Korcz | |
| 6,105,334 | A | 8/2000 | Monson et al. | |
| 6,161,910 | A | 12/2000 | Reisenauer et al. | |
| 6,170,685 | B1 | 1/2001 | Currier | |
| 6,174,076 | B1 | 1/2001 | Petrakis et al. | |
| 6,176,599 | B1 | 1/2001 | Farzen | |
| 6,267,491 | B1 | 7/2001 | Parrigin | |
| 6,332,597 | B1 | 12/2001 | Korcz et al. | |
| 6,350,043 | B1 | 2/2002 | Gloisten | |
| 6,350,046 | B1 | 2/2002 | Lau | |
| 6,364,511 | B1 | 4/2002 | Cohen | |
| 6,375,338 | B1 | 4/2002 | Cummings et al. | |
| 6,402,112 | B1 | 6/2002 | Thomas et al. | |
| 6,423,899 | B1 | 7/2002 | Reiker | |
| D461,455 | S | 8/2002 | Forbes | |
| 6,461,016 | B1 | 10/2002 | Jamison et al. | |
| 6,474,846 | B1 | 11/2002 | Kelmelis et al. | |
| 6,491,413 | B1 * | 12/2002 | Benesohn | F21S 8/02 362/345 |
| D468,697 | S | 1/2003 | Straub, Jr. | |
| D470,970 | S | 2/2003 | Huang | |
| 6,515,313 | B1 | 2/2003 | Ibbetson et al. | |
| 6,521,833 | B1 | 2/2003 | DeFreitas | |
| D471,657 | S | 3/2003 | Huang | |
| 6,583,573 | B2 | 6/2003 | Bierman | |
| 6,585,389 | B2 | 7/2003 | Bonazzi | |
| 6,600,175 | B1 | 7/2003 | Baretz et al. | |
| D478,872 | S | 8/2003 | Heggem | |
| 6,632,006 | B1 | 10/2003 | Rippel et al. | |
| 6,657,236 | B1 | 12/2003 | Thibeault et al. | |
| 6,666,419 | B1 | 12/2003 | Vrame | |
| D488,583 | S | 4/2004 | Benghozi | |
| 6,719,438 | B2 | 4/2004 | Sevack et al. | |
| 6,758,578 | B1 | 7/2004 | Chou | |
| 6,777,615 | B1 | 8/2004 | Gretz | |
| 6,779,908 | B1 | 8/2004 | Ng | |
| 6,827,229 | B2 | 12/2004 | Dinh et al. | |
| 6,827,471 | B1 | 12/2004 | Benghozi | |

(56) References Cited

U.S. PATENT DOCUMENTS

| | | | |
|---|---|---|---|
| 6,838,618 | B2 | 1/2005 | Newbold et al. |
| 6,906,352 | B2 | 6/2005 | Edmond et al. |
| D509,314 | S | 9/2005 | Rashidi |
| 6,948,829 | B2 | 9/2005 | Verdes et al. |
| 6,958,497 | B2 | 10/2005 | Emerson et al. |
| 6,964,501 | B2 | 11/2005 | Ryan |
| 6,967,284 | B1 | 11/2005 | Gretz |
| D516,235 | S | 2/2006 | Rashidi |
| 7,025,477 | B2 | 4/2006 | Blessing |
| 7,064,269 | B2 | 6/2006 | Smith |
| D528,673 | S | 9/2006 | Maxik et al. |
| 7,102,172 | B2 | 9/2006 | Lynch |
| D531,740 | S | 11/2006 | Maxik |
| D532,532 | S | 11/2006 | Maxik |
| 7,148,420 | B1 | 12/2006 | Johnson et al. |
| 7,148,632 | B2 | 12/2006 | Berman et al. |
| 7,154,040 | B1 | 12/2006 | Tompkins |
| 7,170,015 | B1 | 1/2007 | Roesch et al. |
| D536,349 | S | 2/2007 | Humber et al. |
| D537,039 | S | 2/2007 | Pincek |
| D539,229 | S | 3/2007 | Murphey |
| 7,186,008 | B2 | 3/2007 | Patti |
| 7,190,126 | B1 | 3/2007 | Paton |
| 7,211,833 | B2 | 5/2007 | Slater, Jr. et al. |
| 7,213,940 | B1 | 5/2007 | Van De Ven et al. |
| 7,234,674 | B2 | 6/2007 | Rippel et al. |
| D547,889 | S | 7/2007 | Huang |
| D552,969 | S | 10/2007 | Bobrowski et al. |
| D553,267 | S | 10/2007 | Yuen |
| D555,106 | S | 11/2007 | Pape et al. |
| D556,144 | S | 11/2007 | Dinh |
| 7,297,870 | B1 | 11/2007 | Sartini |
| 7,312,474 | B2 | 12/2007 | Emerson et al. |
| 7,320,536 | B2 | 1/2008 | Petrakis et al. |
| D561,372 | S | 2/2008 | Yan |
| D561,373 | S | 2/2008 | Yan |
| 7,335,920 | B2 | 2/2008 | Denbaars et al. |
| D563,896 | S | 3/2008 | Greenslate |
| 7,347,580 | B2 | 3/2008 | Blackman et al. |
| D570,012 | S | 5/2008 | Huang |
| 7,374,308 | B2 | 5/2008 | Sevack et al. |
| D570,504 | S | 6/2008 | Maxik et al. |
| D570,505 | S | 6/2008 | Maxik et al. |
| 7,399,104 | B2 | 7/2008 | Rappaport |
| 7,413,156 | B1 | 8/2008 | Cho |
| 7,429,025 | B1 | 9/2008 | Gretz |
| D578,677 | S | 10/2008 | Huang |
| 7,431,482 | B1 | 10/2008 | Morgan et al. |
| 7,432,440 | B2 | 10/2008 | Hull et al. |
| 7,442,883 | B2 | 10/2008 | Jolly et al. |
| 7,446,345 | B2 | 11/2008 | Emerson et al. |
| 7,470,048 | B2 | 12/2008 | Wu |
| 7,473,005 | B2 | 1/2009 | O'Brien |
| 7,488,097 | B2 | 2/2009 | Reisenauer et al. |
| 7,488,098 | B2 | 2/2009 | Dumont |
| 7,503,145 | B2 | 3/2009 | Newbold et al. |
| 7,524,089 | B2 | 4/2009 | Park |
| D591,894 | S | 5/2009 | Flank |
| 7,534,989 | B2 | 5/2009 | Suehara et al. |
| D596,154 | S | 7/2009 | Rivkin |
| 7,566,154 | B2 | 7/2009 | Gloisten et al. |
| D599,040 | S | 8/2009 | Alexander et al. |
| D600,836 | S | 9/2009 | Hanley et al. |
| 7,588,359 | B2 | 9/2009 | Coushaine et al. |
| 7,592,583 | B2 | 9/2009 | Page et al. |
| D606,696 | S | 12/2009 | Chen et al. |
| 7,625,105 | B1 | 12/2009 | Johnson |
| 7,628,513 | B2 | 12/2009 | Chiu |
| 7,651,238 | B2 | 1/2010 | O'Brien |
| 7,654,705 | B2 | 2/2010 | Czech et al. |
| D611,650 | S | 3/2010 | Broekhoff |
| 7,670,021 | B2 | 3/2010 | Chou |
| 7,673,841 | B2 | 3/2010 | Wronski |
| 7,677,766 | B2 | 3/2010 | Boyer |
| D613,444 | S | 4/2010 | Rashidi |
| 7,692,182 | B2 | 4/2010 | Bergmann et al. |
| 7,699,283 | B2 | 4/2010 | Vrame |
| 7,704,763 | B2 | 4/2010 | Fujii et al. |
| D616,118 | S | 5/2010 | Thomas et al. |
| 7,712,922 | B2 | 5/2010 | Hacker et al. |
| 7,722,208 | B1 | 5/2010 | Dupre et al. |
| 7,722,227 | B2 | 5/2010 | Zhang et al. |
| 7,735,795 | B2 | 6/2010 | Wronski |
| 7,735,798 | B2 | 6/2010 | Kojima |
| 7,748,887 | B2 | 7/2010 | Zampini, II et al. |
| 7,766,518 | B2 | 8/2010 | Piepgras et al. |
| 7,769,192 | B2 | 8/2010 | Takagi et al. |
| 7,771,082 | B2 | 8/2010 | Peng |
| 7,771,094 | B2 | 8/2010 | Goode |
| 7,784,754 | B2 | 8/2010 | Nevers et al. |
| D624,691 | S | 9/2010 | Zhang et al. |
| D624,692 | S | 9/2010 | Mackin et al. |
| D625,847 | S | 10/2010 | Maglica |
| D625,876 | S | 10/2010 | Chen et al. |
| D627,507 | S | 11/2010 | Lai et al. |
| D627,727 | S | 11/2010 | Alexander et al. |
| 7,828,465 | B2 | 11/2010 | Roberge et al. |
| D629,366 | S | 12/2010 | Ericson et al. |
| 7,845,393 | B2 | 12/2010 | Kao et al. |
| 7,857,275 | B2 | 12/2010 | de la Borbolla |
| 7,871,184 | B2 | 1/2011 | Peng |
| 7,874,539 | B2 | 1/2011 | Wright et al. |
| 7,874,703 | B2 | 1/2011 | Shastry et al. |
| 7,874,709 | B1 | 1/2011 | Beadle |
| D633,224 | S | 2/2011 | Lee |
| 7,909,487 | B1 | 3/2011 | Venetucci et al. |
| D636,117 | S | 4/2011 | Kim et al. |
| D636,118 | S | 4/2011 | Kim et al. |
| D636,903 | S | 4/2011 | Torenbeek |
| D637,339 | S | 5/2011 | Hasan et al. |
| D637,340 | S | 5/2011 | Hasan et al. |
| 7,950,832 | B2 | 5/2011 | Tanaka et al. |
| D639,499 | S | 6/2011 | Choi et al. |
| D640,819 | S | 6/2011 | Pan |
| 7,956,546 | B2 | 6/2011 | Hasnain |
| 7,959,332 | B2 | 6/2011 | Tickner et al. |
| 7,967,480 | B2 | 6/2011 | Pickard et al. |
| D642,317 | S | 7/2011 | Rashidi |
| 7,972,035 | B2 | 7/2011 | Boyer |
| 7,972,043 | B2 | 7/2011 | Schutte |
| D642,536 | S | 8/2011 | Robinson |
| D643,970 | S | 8/2011 | Kim et al. |
| 7,993,037 | B1 | 8/2011 | Buse |
| 8,002,425 | B2 | 8/2011 | Russo et al. |
| D646,011 | S | 9/2011 | Rashidi |
| 8,013,243 | B2 | 9/2011 | Korcz et al. |
| 8,038,113 | B2 | 10/2011 | Fryzek et al. |
| D648,476 | S | 11/2011 | Choi et al. |
| D648,477 | S | 11/2011 | Kim et al. |
| D650,115 | S | 12/2011 | Kim et al. |
| 8,070,328 | B1 | 12/2011 | Knoble et al. |
| 8,096,670 | B2 | 1/2012 | Trott |
| D654,205 | S | 2/2012 | Rashidi |
| D655,436 | S | 3/2012 | Johnson |
| D656,262 | S | 3/2012 | Yoshinobu et al. |
| D656,263 | S | 3/2012 | Ogawa et al. |
| 8,142,057 | B2 | 3/2012 | Roos et al. |
| 8,152,334 | B2 | 4/2012 | Krogman |
| D658,788 | S | 5/2012 | Dudik et al. |
| D658,802 | S | 5/2012 | Chen |
| D659,862 | S | 5/2012 | Tsai |
| D659,879 | S | 5/2012 | Rashidi |
| D660,814 | S | 5/2012 | Wilson |
| 8,182,116 | B2 | 5/2012 | Zhang et al. |
| 8,201,968 | B2 | 6/2012 | Maxik et al. |
| D663,058 | S | 7/2012 | Pan |
| D663,466 | S | 7/2012 | Rashidi |
| D664,274 | S | 7/2012 | de Visser et al. |
| D664,705 | S | 7/2012 | Kong et al. |
| 8,215,805 | B2 | 7/2012 | Cogliano et al. |
| 8,220,970 | B1 | 7/2012 | Khazi et al. |
| 8,226,270 | B2 | 7/2012 | Yamamoto et al. |
| 8,235,549 | B2 | 8/2012 | Gingrich, III et al. |
| 8,240,630 | B2 | 8/2012 | Wronski |

(56) References Cited

U.S. PATENT DOCUMENTS

| | | | |
|---|---|---|---|
| D667,155 S | 9/2012 | Rashidi | |
| 8,262,255 B1 | 9/2012 | Rashidi | |
| D668,372 S | 10/2012 | Renshaw et al. | |
| D668,809 S | 10/2012 | Rashidi | |
| D669,198 S | 10/2012 | Qiu | |
| D669,199 S | 10/2012 | Chuang | |
| D669,620 S | 10/2012 | Rashidi | |
| 8,277,090 B2 | 10/2012 | Fryzek et al. | |
| D671,668 S | 11/2012 | Rowlette, Jr. et al. | |
| 8,308,322 B2 | 11/2012 | Santiago et al. | |
| D672,899 S | 12/2012 | Van de Ven et al. | |
| D673,869 S | 1/2013 | Yu | |
| D676,263 S | 2/2013 | Birke | |
| D676,814 S | 2/2013 | Paul | |
| 8,376,593 B2 | 2/2013 | Bazydola et al. | |
| D677,417 S | 3/2013 | Rashidi | |
| D677,634 S | 3/2013 | Korcz et al. | |
| D679,044 S | 3/2013 | Jeswani et al. | |
| D679,047 S | 3/2013 | Tickner et al. | |
| 8,403,289 B1 | 3/2013 | Rinderer | |
| 8,403,533 B1 | 3/2013 | Paulsel | |
| 8,403,541 B1 | 3/2013 | Rashidi | |
| 8,405,947 B1 | 3/2013 | Green et al. | |
| D681,259 S | 4/2013 | Kong | |
| 8,408,759 B1 | 4/2013 | Rashidi | |
| D682,459 S | 5/2013 | Gordin et al. | |
| D683,063 S | 5/2013 | Lopez et al. | |
| D683,890 S | 6/2013 | Lopez et al. | |
| D684,269 S | 6/2013 | Wang et al. | |
| D684,287 S | 6/2013 | Rashidi | |
| D684,719 S | 6/2013 | Rashidi | |
| D685,118 S | 6/2013 | Rashidi | |
| D685,120 S | 6/2013 | Rashidi | |
| 8,454,204 B1 | 6/2013 | Chang et al. | |
| D685,507 S | 7/2013 | Sun | |
| D687,586 S | 8/2013 | Rashidi | |
| D687,587 S | 8/2013 | Rashidi | |
| D687,588 S | 8/2013 | Rashidi | |
| D687,980 S | 8/2013 | Gravely et al. | |
| D688,405 S | 8/2013 | Kim et al. | |
| 8,506,127 B2 | 8/2013 | Russello et al. | |
| 8,506,134 B2 | 8/2013 | Wilson et al. | |
| D690,049 S | 9/2013 | Rashidi | |
| D690,864 S | 10/2013 | Rashidi | |
| D690,865 S | 10/2013 | Rashidi | |
| D690,866 S | 10/2013 | Rashidi | |
| D691,314 S | 10/2013 | Rashidi | |
| D691,315 S | 10/2013 | Samson | |
| D691,763 S | 10/2013 | Hand et al. | |
| 8,550,669 B2 | 10/2013 | Macwan et al. | |
| D693,043 S | 11/2013 | Schmalfuss et al. | |
| D693,517 S | 11/2013 | Davis | |
| D694,456 S | 11/2013 | Rowlette, Jr. et al. | |
| 8,573,816 B2 | 11/2013 | Negley et al. | |
| D695,441 S | 12/2013 | Lui et al. | |
| D695,941 S | 12/2013 | Rashidi | |
| D696,446 S | 12/2013 | Huh | |
| D696,447 S | 12/2013 | Huh | |
| D696,448 S | 12/2013 | Huh | |
| 8,602,601 B2 | 12/2013 | Khazi et al. | |
| D698,067 S | 1/2014 | Rashidi | |
| D698,068 S | 1/2014 | Rashidi | |
| 8,622,361 B2 | 1/2014 | Wronski | |
| 8,632,040 B2 | 1/2014 | Mass et al. | |
| D698,985 S | 2/2014 | Lopez et al. | |
| D699,384 S | 2/2014 | Rashidi | |
| D699,687 S | 2/2014 | Baldwin et al. | |
| D700,387 S | 2/2014 | Snell | |
| 8,641,243 B1 | 2/2014 | Rashidi | |
| 8,651,705 B2 | 2/2014 | Wilcox | |
| 8,659,034 B2 | 2/2014 | Baretz et al. | |
| D700,991 S | 3/2014 | Johnson et al. | |
| D701,175 S | 3/2014 | Baldwin et al. | |
| D701,466 S | 3/2014 | Clifford et al. | |
| 8,672,518 B2 | 3/2014 | Boomgaarden et al. | |
| D702,867 S | 4/2014 | Kim et al. | |
| D703,843 S | 4/2014 | Cheng | |
| 8,684,569 B2 | 4/2014 | Pickard et al. | |
| 8,696,158 B2 | 4/2014 | Santiago et al. | |
| D705,472 S | 5/2014 | Huh | |
| D705,481 S | 5/2014 | Zhang et al. | |
| 8,727,582 B2 | 5/2014 | Brown et al. | |
| D708,381 S | 7/2014 | Rashidi | |
| 8,777,449 B2 | 7/2014 | Ven et al. | |
| D710,529 S | 8/2014 | Lopez et al. | |
| 8,801,217 B2 | 8/2014 | Oehle et al. | |
| 8,820,985 B1 | 9/2014 | Tam et al. | |
| 8,833,013 B2 | 9/2014 | Harman | |
| 8,845,144 B1 | 9/2014 | Davis et al. | |
| D714,989 S | 10/2014 | Rowlette, Jr. et al. | |
| 8,870,426 B2 | 10/2014 | Biebl et al. | |
| 8,890,414 B2 | 11/2014 | Rowlette, Jr. et al. | |
| D721,845 S | 1/2015 | Lui et al. | |
| 8,926,133 B2 | 1/2015 | Booth | |
| 8,939,418 B2 | 1/2015 | Green et al. | |
| D722,296 S | 2/2015 | Taylor | |
| D722,977 S | 2/2015 | Hagarty | |
| D722,978 S | 2/2015 | Hagarty | |
| 8,950,898 B2 | 2/2015 | Catalano | |
| D723,781 S | 3/2015 | Miner | |
| D723,783 S | 3/2015 | Miner | |
| D725,359 S | 3/2015 | Miner | |
| D726,363 S | 4/2015 | Danesh | |
| D726,949 S | 4/2015 | Redfern | |
| D728,129 S | 4/2015 | Kreuzbichler | |
| 9,004,435 B2 | 4/2015 | Wronski | |
| 9,039,254 B2 | 5/2015 | Danesh | |
| D731,689 S | 6/2015 | Bernard et al. | |
| 9,062,866 B1 | 6/2015 | Christ et al. | |
| 9,065,264 B2 | 6/2015 | Cooper et al. | |
| 9,068,719 B2 | 6/2015 | Van De Ven et al. | |
| 9,068,722 B2 | 6/2015 | Wronski et al. | |
| D734,525 S | 7/2015 | Gordin et al. | |
| D735,012 S | 7/2015 | Cowie | |
| D735,142 S | 7/2015 | Hagarty | |
| 9,078,299 B2 | 7/2015 | Ashdown | |
| 9,109,783 B1 | 8/2015 | Davis et al. | |
| D739,355 S | 9/2015 | D'Aubeterre | |
| D739,590 S | 9/2015 | Redfern | |
| 9,140,441 B2 | 9/2015 | Goelz et al. | |
| D741,538 S | 10/2015 | Ghasabi | |
| 9,151,457 B2 | 10/2015 | Pickard et al. | |
| 9,151,477 B2 | 10/2015 | Pickard et al. | |
| D742,325 S | 11/2015 | Leung | |
| D743,079 S | 11/2015 | Adair | |
| D744,723 S | 12/2015 | Yoo | |
| 9,217,560 B2 | 12/2015 | Harbers et al. | |
| 9,222,661 B2 | 12/2015 | Kim et al. | |
| 9,239,131 B1 | 1/2016 | Wronski et al. | |
| D750,317 S | 2/2016 | Lui et al. | |
| 9,285,103 B2 | 3/2016 | Van De Ven et al. | |
| 9,291,319 B2 | 3/2016 | Kathawate et al. | |
| 9,301,362 B2 | 3/2016 | Dohn et al. | |
| D754,078 S | 4/2016 | Baldwin et al. | |
| D754,079 S | 4/2016 | Baldwin et al. | |
| D754,605 S | 4/2016 | McMillan | |
| 9,303,812 B2 | 4/2016 | Green et al. | |
| 9,310,038 B2 | 4/2016 | Athalye | |
| 9,322,543 B2 | 4/2016 | Hussell et al. | |
| 9,347,655 B2 | 5/2016 | Boomgaarden et al. | |
| 9,366,418 B2 * | 6/2016 | Gifford | F21V 21/03 |
| 9,371,966 B2 | 6/2016 | Rowlette, Jr. et al. | |
| D762,181 S | 7/2016 | Lin | |
| 9,395,051 B2 | 7/2016 | Hussell et al. | |
| D762,906 S | 8/2016 | Jeswani et al. | |
| D764,079 S | 8/2016 | Wu | |
| 9,417,506 B1 | 8/2016 | Tirosh | |
| 9,423,110 B1 | 8/2016 | Newton et al. | |
| D766,185 S | 9/2016 | Hagarty | |
| D767,199 S | 9/2016 | Wronski et al. | |
| 9,447,917 B1 | 9/2016 | Wronski et al. | |
| 9,447,953 B2 | 9/2016 | Lawlor | |
| D768,325 S | 10/2016 | Xu | |
| D768,326 S | 10/2016 | Guzzini | |

(56) References Cited

U.S. PATENT DOCUMENTS

| | | | |
|---|---|---|---|
| D769,501 | S | 10/2016 | Jeswani et al. |
| D770,065 | S | 10/2016 | Tittle |
| D770,076 | S | 10/2016 | Li et al. |
| 9,476,552 | B2 | 10/2016 | Myers et al. |
| D774,676 | S | 12/2016 | Ng |
| D776,324 | S | 1/2017 | Gierl et al. |
| D777,967 | S | 1/2017 | Redfern |
| 9,534,751 | B2 | 1/2017 | Maglica et al. |
| D778,241 | S | 2/2017 | Holbrook et al. |
| D778,484 | S | 2/2017 | Guzzini |
| D779,100 | S | 2/2017 | Redfern |
| 9,581,302 | B2 | 2/2017 | Danesh |
| 9,599,315 | B1 | 3/2017 | Harpenau et al. |
| 9,605,842 | B1 | 3/2017 | Davis |
| 9,605,910 | B2 | 3/2017 | Swedberg et al. |
| D785,228 | S | 4/2017 | Guzzini |
| D786,472 | S | 5/2017 | Redfern |
| D786,473 | S | 5/2017 | Dean |
| D786,474 | S | 5/2017 | Fujisawa |
| D788,330 | S | 5/2017 | Johnson et al. |
| D790,102 | S | 6/2017 | Guzzini |
| 9,673,597 | B2 | 6/2017 | Lee |
| 9,689,541 | B2 | 6/2017 | Wronski |
| D791,709 | S | 7/2017 | Holton |
| D791,711 | S | 7/2017 | Holton |
| D791,712 | S | 7/2017 | Holton |
| 9,696,021 | B2 | 7/2017 | Wronski |
| 9,702,516 | B1 | 7/2017 | Vasquez et al. |
| D795,820 | S | 8/2017 | Wengreen |
| 9,732,904 | B1 | 8/2017 | Wronski |
| 9,732,947 | B1 | 8/2017 | Christ et al. |
| 9,739,464 | B2 | 8/2017 | Wronski |
| D799,105 | S | 10/2017 | Eder et al. |
| D800,957 | S | 10/2017 | Eder et al. |
| 9,791,111 | B1 | 10/2017 | Huang et al. |
| 9,797,562 | B2 | 10/2017 | Dabiet et al. |
| 9,803,839 | B2 | 10/2017 | Visser et al. |
| D805,660 | S | 12/2017 | Creasman et al. |
| 9,854,642 | B2 | 12/2017 | Kashani |
| D809,176 | S | 1/2018 | Partington |
| 9,860,961 | B2 | 1/2018 | Chemel et al. |
| 9,863,619 | B2 | 1/2018 | Mak |
| D809,465 | S | 2/2018 | Keirstead |
| 9,903,569 | B2 * | 2/2018 | O'Brien .................. F21V 29/83 |
| 9,945,548 | B2 | 4/2018 | Williams et al. |
| 9,964,266 | B2 | 5/2018 | Danesh |
| D820,494 | S | 6/2018 | Cohen |
| D821,615 | S | 6/2018 | Trice |
| D821,627 | S | 6/2018 | Ko |
| 9,995,441 | B2 | 6/2018 | Power et al. |
| D822,505 | S | 7/2018 | Gibson et al. |
| D824,494 | S | 7/2018 | Martins et al. |
| D825,829 | S | 8/2018 | Guo |
| 10,041,638 | B2 | 8/2018 | Vasquez et al. |
| 10,054,274 | B2 | 8/2018 | Athalye et al. |
| D827,903 | S | 9/2018 | Wu |
| 10,072,805 | B2 | 9/2018 | Bailey |
| D832,218 | S | 10/2018 | Wronski et al. |
| D833,977 | S | 11/2018 | Danesh et al. |
| 10,125,959 | B2 | 11/2018 | Cohen |
| 10,139,059 | B2 | 11/2018 | Danesh |
| D836,976 | S | 1/2019 | Reese et al. |
| 10,244,607 | B1 | 3/2019 | Kashani |
| D847,414 | S | 4/2019 | Danesh et al. |
| D847,415 | S | 4/2019 | Danesh et al. |
| 10,247,390 | B1 | 4/2019 | Kopitzke, IV |
| D848,375 | S | 5/2019 | Danesh et al. |
| 10,281,131 | B2 | 5/2019 | Cohen |
| 10,295,163 | B1 | 5/2019 | Cohen |
| D850,695 | S | 6/2019 | Dabiet et al. |
| D851,046 | S | 6/2019 | Peng et al. |
| 10,408,395 | B2 | 9/2019 | Danesh |
| 10,408,396 | B2 | 9/2019 | Wronski et al. |
| 10,408,436 | B2 | 9/2019 | Wronski et al. |
| D863,661 | S | 10/2019 | Tian et al. |
| D864,467 | S | 10/2019 | Mizobe |
| D864,877 | S | 10/2019 | Danesh |
| D867,653 | S | 11/2019 | Gorman |
| 10,488,000 | B2 | 11/2019 | Danesh et al. |
| 10,551,044 | B2 | 2/2020 | Peng et al. |
| 10,563,850 | B2 | 2/2020 | Danesh |
| D877,957 | S | 3/2020 | Kopitzke, IV |
| 10,591,120 | B2 | 3/2020 | Bailey et al. |
| 10,609,785 | B1 | 3/2020 | Fardadi et al. |
| D880,733 | S | 4/2020 | Lo et al. |
| D883,562 | S | 5/2020 | Hu |
| D885,648 | S | 5/2020 | Zeng |
| D885,649 | S | 5/2020 | McLaughlin, III et al. |
| 10,663,127 | B2 | 5/2020 | Danesh et al. |
| 10,663,153 | B2 | 5/2020 | Nikooyan et al. |
| D888,313 | S | 6/2020 | Xie et al. |
| 10,683,994 | B2 | 6/2020 | Wronski et al. |
| 10,684,003 | B2 | 6/2020 | Wronski et al. |
| D890,410 | S | 7/2020 | Stanford et al. |
| 10,704,745 | B2 | 7/2020 | Sherry et al. |
| D892,069 | S | 8/2020 | Cohen |
| 10,753,558 | B2 | 8/2020 | Danesh |
| 10,808,917 | B2 | 10/2020 | Harris et al. |
| 10,816,148 | B2 | 10/2020 | Danesh |
| D901,398 | S | 11/2020 | Danesh et al. |
| D901,745 | S | 11/2020 | Yang |
| D902,871 | S | 11/2020 | Danesh et al. |
| D903,605 | S | 12/2020 | Danesh et al. |
| D905,327 | S | 12/2020 | Williams et al. |
| D907,284 | S | 1/2021 | Danesh et al. |
| D910,223 | S | 2/2021 | Cohen |
| 10,975,570 | B2 | 4/2021 | Shen |
| 10,982,829 | B2 | 4/2021 | Danesh |
| 11,015,785 | B1 | 5/2021 | Schubert |
| 11,022,259 | B2 | 6/2021 | Bailey et al. |
| 11,028,982 | B2 | 6/2021 | Danesh |
| 11,047,538 | B2 | 6/2021 | Danesh et al. |
| D924,467 | S | 7/2021 | Danesh et al. |
| D925,109 | S | 7/2021 | Danesh et al. |
| 11,060,705 | B1 | 7/2021 | Danesh et al. |
| 11,067,231 | B2 | 7/2021 | Lotfi et al. |
| D927,430 | S | 8/2021 | Cohen et al. |
| 11,085,597 | B2 | 8/2021 | Danesh |
| 11,118,768 | B2 | 9/2021 | Danesh |
| D939,134 | S | 12/2021 | Danesh et al. |
| 11,231,154 | B2 | 1/2022 | Kopitzke et al. |
| D944,212 | S | 2/2022 | Peng et al. |
| 11,242,983 | B2 | 2/2022 | Danesh |
| 11,255,497 | B2 | 2/2022 | Danesh |
| 11,274,821 | B2 | 3/2022 | Danesh |
| 11,306,903 | B2 | 4/2022 | Young |
| 11,391,442 | B2 | 7/2022 | Danesh |
| 11,435,064 | B1 | 9/2022 | Danesh |
| 11,435,066 | B2 | 9/2022 | Danesh |
| 11,448,384 | B2 | 9/2022 | Nikooyan et al. |
| D966,877 | S | 10/2022 | Kopitzke et al. |
| D970,081 | S | 11/2022 | Kopitzke et al. |
| 1,454,722 | A1 | 5/2023 | Leo |
| 11,800,617 | B2 | 10/2023 | Kumar et al. |
| 2002/0172047 | A1 | 11/2002 | Ashley |
| 2003/0006353 | A1 | 1/2003 | Dinh et al. |
| 2003/0016532 | A1 | 1/2003 | Reed |
| 2003/0021104 | A1 | 1/2003 | Tsao |
| 2003/0092323 | A1 | 5/2003 | Chou |
| 2003/0161153 | A1 | 8/2003 | Patti |
| 2004/0001337 | A1 | 1/2004 | Defouw et al. |
| 2004/0120141 | A1 | 6/2004 | Beadle |
| 2004/0156199 | A1 | 8/2004 | Rivas et al. |
| 2005/0078474 | A1 | 4/2005 | Whitfield |
| 2005/0121215 | A1 | 6/2005 | Halbert |
| 2005/0225966 | A1 | 10/2005 | Hartmann et al. |
| 2005/0227536 | A1 | 10/2005 | Gamache et al. |
| 2005/0231962 | A1 | 10/2005 | Koba et al. |
| 2005/0237746 | A1 | 10/2005 | Yiu |
| 2006/0005988 | A1 | 1/2006 | Jorgensen |
| 2006/0158873 | A1 | 7/2006 | Newbold et al. |
| 2006/0198126 | A1 | 9/2006 | Jones |
| 2006/0215408 | A1 | 9/2006 | Lee |
| 2006/0221620 | A1 | 10/2006 | Thomas |

(56) References Cited

U.S. PATENT DOCUMENTS

2006/0237601 A1 10/2006 Rinderer
2006/0243877 A1 11/2006 Rippel
2006/0250788 A1 11/2006 Hodge et al.
2006/0262536 A1 11/2006 Nevers
2006/0262545 A1 11/2006 Piepgras et al.
2007/0012847 A1 1/2007 Tai
2007/0035951 A1 2/2007 Tseng
2007/0121328 A1 5/2007 Mondloch et al.
2007/0131827 A1 6/2007 Nevers et al.
2007/0185675 A1 8/2007 Papamichael et al.
2007/0200039 A1 8/2007 Petak
2007/0206374 A1 9/2007 Petrakis et al.
2008/0002414 A1 1/2008 Miletich et al.
2008/0068847 A1 3/2008 Bedard
2008/0112168 A1 5/2008 Pickard et al.
2008/0112170 A1 5/2008 Trott
2008/0112171 A1 5/2008 Patti et al.
2008/0130308 A1 6/2008 Behr et al.
2008/0137347 A1 6/2008 Trott et al.
2008/0165545 A1 7/2008 O'Brien
2008/0170404 A1 7/2008 Steer et al.
2008/0186718 A1 8/2008 Magisano et al.
2008/0224008 A1 9/2008 Dal Ponte et al.
2008/0232116 A1 9/2008 Kim
2008/0247181 A1 10/2008 Dixon
2008/0285271 A1 11/2008 Roberge et al.
2009/0003009 A1 1/2009 Tessnow et al.
2009/0034261 A1* 2/2009 Grove .................... F21V 29/83 362/294
2009/0080189 A1 3/2009 Wegner
2009/0086484 A1 4/2009 Johnson
2009/0097262 A1 4/2009 Zhang et al.
2009/0135613 A1 5/2009 Peng
2009/0141500 A1 6/2009 Peng
2009/0141506 A1 6/2009 Lan et al.
2009/0141508 A1 6/2009 Peng
2009/0147517 A1 6/2009 Li
2009/0161356 A1 6/2009 Negley et al.
2009/0237924 A1 9/2009 Ladewig
2009/0280695 A1 11/2009 Sekela et al.
2009/0283292 A1 11/2009 Lehr
2009/0290343 A1 11/2009 Brown et al.
2010/0014282 A1 1/2010 Danesh
2010/0033095 A1 2/2010 Sadwick
2010/0061108 A1 3/2010 Zhang et al.
2010/0067226 A1 3/2010 Higuchi et al.
2010/0110690 A1 5/2010 Hsu et al.
2010/0110698 A1 5/2010 Harwood et al.
2010/0110699 A1 5/2010 Chou
2010/0148673 A1 6/2010 Stewart et al.
2010/0149822 A1* 6/2010 Cogliano ................ F21V 21/30 362/365
2010/0155497 A1 6/2010 Hagaman
2010/0165643 A1 7/2010 Russo et al.
2010/0244709 A1 9/2010 Steiner et al.
2010/0246172 A1 9/2010 Liu
2010/0259919 A1 10/2010 Khazi et al.
2010/0270903 A1 10/2010 Jao et al.
2010/0277905 A1* 11/2010 Janik ...................... F21S 8/026 315/297
2010/0284185 A1 11/2010 Ngai
2010/0302778 A1* 12/2010 Dabiet ..................... F21S 8/02 362/249.02
2010/0328956 A1 12/2010 Zhang
2011/0043040 A1 2/2011 Porter et al.
2011/0063831 A1 3/2011 Cook
2011/0068687 A1 3/2011 Takahasi et al.
2011/0069499 A1 3/2011 Trott et al.
2011/0080750 A1 4/2011 Jones et al.
2011/0116276 A1 5/2011 Okamura et al.
2011/0121756 A1 5/2011 Thomas et al.
2011/0134634 A1 6/2011 Gingrich, III et al.
2011/0134651 A1 6/2011 Berman
2011/0140633 A1 6/2011 Archenhold
2011/0170294 A1 7/2011 Mier-Langner et al.
2011/0194299 A1 8/2011 Crooks et al.
2011/0216534 A1 9/2011 Tickner et al.
2011/0226919 A1 9/2011 Fryzek et al.
2011/0255292 A1 10/2011 Shen
2011/0267828 A1 11/2011 Bazydola et al.
2011/0285314 A1 11/2011 Carney et al.
2012/0020104 A1 1/2012 Biebl et al.
2012/0074852 A1 3/2012 Delnoij
2012/0106176 A1 5/2012 Lopez et al.
2012/0113642 A1 5/2012 Catalano
2012/0140442 A1 6/2012 Woo et al.
2012/0140465 A1 6/2012 Rowlette, Jr. et al.
2012/0162994 A1 6/2012 Wasniewski et al.
2012/0182744 A1 7/2012 Santiago et al.
2012/0188762 A1 7/2012 Joung et al.
2012/0243237 A1 9/2012 Toda et al.
2012/0250321 A1 10/2012 Blincoe et al.
2012/0266449 A1 10/2012 Krupa
2012/0268688 A1 10/2012 Sato et al.
2012/0287625 A1 11/2012 Macwan et al.
2012/0305868 A1 12/2012 Callahan et al.
2012/0314429 A1 12/2012 Plunk
2013/0009552 A1 1/2013 Page
2013/0010476 A1 1/2013 Pickard et al.
2013/0016864 A1 1/2013 Ivey et al.
2013/0033872 A1* 2/2013 Randolph ............... F21V 29/89 362/311.06
2013/0050994 A1 2/2013 Pieper
2013/0051012 A1 2/2013 Oehle et al.
2013/0077307 A1 3/2013 Yamamoto
2013/0083529 A1 4/2013 Gifford
2013/0141913 A1 6/2013 Sachsenweger
2013/0155681 A1 6/2013 Nall et al.
2013/0163254 A1 6/2013 Chang et al.
2013/0170232 A1 7/2013 Park et al.
2013/0170233 A1 7/2013 Nezu et al.
2013/0201699 A1 8/2013 Kato et al.
2013/0227908 A1 9/2013 Gulbrandsen et al.
2013/0258677 A1 10/2013 Fryzek et al.
2013/0265750 A1 10/2013 Pickard et al.
2013/0271989 A1 10/2013 Hussell et al.
2013/0294084 A1 11/2013 Kathawate et al.
2013/0301252 A1 11/2013 Hussell et al.
2013/0322062 A1* 12/2013 Danesh ..................... F21S 8/02 362/382
2013/0322084 A1 12/2013 Ebisawa
2013/0335980 A1 12/2013 Nakasuji et al.
2014/0029262 A1 1/2014 Maxik et al.
2014/0036497 A1 2/2014 Hussell et al.
2014/0049957 A1 2/2014 Goelz et al.
2014/0063776 A1 3/2014 Clark et al.
2014/0063818 A1 3/2014 Randolph et al.
2014/0071679 A1* 3/2014 Booth ..................... F21S 8/026 362/249.02
2014/0071687 A1 3/2014 Tickner et al.
2014/0140490 A1 5/2014 Roberts et al.
2014/0233246 A1 8/2014 Lafreniere et al.
2014/0254177 A1 9/2014 Danesh
2014/0268836 A1 9/2014 Thompson
2014/0268869 A1 9/2014 Blessitt et al.
2014/0299730 A1 10/2014 Green et al.
2014/0313775 A1 10/2014 Myers et al.
2014/0321122 A1 10/2014 Domagala et al.
2014/0347848 A1 11/2014 Pisavadia et al.
2015/0029732 A1 1/2015 Hatch
2015/0078008 A1 3/2015 He
2015/0085495 A1 3/2015 Seki
2015/0085500 A1 3/2015 Cooper et al.
2015/0092449 A1 4/2015 Demuynck et al.
2015/0131301 A1 5/2015 Ho
2015/0138779 A1 5/2015 Livesay et al.
2015/0153635 A1 6/2015 Chen et al.
2015/0176823 A1 6/2015 Leshniak et al.
2015/0184837 A1 7/2015 Zhang et al.
2015/0198324 A1 7/2015 O'Brien et al.
2015/0204491 A1 7/2015 Yuan et al.
2015/0219317 A1 8/2015 Gatof et al.
2015/0241039 A1 8/2015 Fryzek
2015/0263497 A1 9/2015 Korcz et al.

(56) References Cited

U.S. PATENT DOCUMENTS

| | | | |
|---|---|---|---|
| 2015/0276185 | A1 | 10/2015 | Bailey et al. |
| 2015/0308662 | A1 | 10/2015 | Vice et al. |
| 2015/0345761 | A1 | 12/2015 | Lawlor |
| 2015/0362159 | A1 | 12/2015 | Ludyjan |
| 2016/0084488 | A1 | 3/2016 | Wu Weiquan et al. |
| 2016/0178181 | A1 | 6/2016 | LaDuca |
| 2016/0209007 | A1 | 7/2016 | Belmonte et al. |
| 2016/0230969 | A1 | 8/2016 | Pelletier et al. |
| 2016/0238225 | A1 | 8/2016 | Rashidi Doust |
| 2016/0308342 | A1 | 10/2016 | Witherbee et al. |
| 2016/0348860 | A1 | 12/2016 | Danesh |
| 2016/0366738 | A1 | 12/2016 | Boulanger et al. |
| 2017/0003007 | A1 | 1/2017 | Wronski |
| 2017/0005460 | A1 | 1/2017 | Lee |
| 2017/0045213 | A1 | 2/2017 | Williams et al. |
| 2017/0059135 | A1 | 3/2017 | Jones |
| 2017/0138581 | A1 | 5/2017 | Doust |
| 2017/0167672 | A1 | 6/2017 | Stauner et al. |
| 2017/0167699 | A1 | 6/2017 | Schubert et al. |
| 2017/0198896 | A1 | 7/2017 | May |
| 2017/0284616 | A1 | 10/2017 | Coakley et al. |
| 2017/0307188 | A1 | 10/2017 | Oudina et al. |
| 2017/0307198 | A1 | 10/2017 | Shah et al. |
| 2018/0112857 | A1 | 4/2018 | Wronski et al. |
| 2018/0119907 | A1 | 5/2018 | O'Brien et al. |
| 2018/0142871 | A1 | 5/2018 | Morales |
| 2018/0156431 | A1 | 6/2018 | Zhuang et al. |
| 2018/0216809 | A1 | 8/2018 | Cohen |
| 2018/0224095 | A1 | 8/2018 | Cohen |
| 2018/0283677 | A1 | 10/2018 | Cohen |
| 2019/0032874 | A1 | 1/2019 | Bonnetto et al. |
| 2019/0041050 | A1 | 2/2019 | Cairns et al. |
| 2019/0063724 | A1 | 2/2019 | Vice, Jr. et al. |
| 2019/0195475 | A1 | 6/2019 | Jones |
| 2019/0195479 | A1 | 6/2019 | Bonne |
| 2019/0249852 | A1 | 8/2019 | Kim |
| 2019/0301710 | A1 | 10/2019 | Harris |
| 2019/0353341 | A1 | 11/2019 | Spiro |
| 2020/0049326 | A1 | 2/2020 | Brown et al. |
| 2020/0182420 | A1 | 6/2020 | Cohen et al. |
| 2020/0355334 | A1 | 11/2020 | Shen et al. |
| 2021/0010647 | A1 | 1/2021 | Danesh et al. |
| 2021/0071833 | A1 | 3/2021 | Hou et al. |
| 2021/0080081 | A1 | 3/2021 | Cohen |
| 2021/0080084 | A1 | 3/2021 | Danesh et al. |
| 2021/0364139 | A1 | 11/2021 | Danesh |
| 2022/0018522 | A1 | 1/2022 | Kopitzke et al. |
| 2022/0018523 | A1 | 1/2022 | Vinh et al. |
| 2022/0042664 | A1 | 2/2022 | Lotfi et al. |
| 2022/0082233 | A1 | 3/2022 | Kopitzke et al. |
| 2023/0125086 | A1 | 4/2023 | Ungaro |

FOREIGN PATENT DOCUMENTS

| | | | |
|---|---|---|---|
| CA | 2691480 | C | 4/2012 |
| CA | 2734369 | A1 | 10/2013 |
| CA | 2561459 | A1 | 11/2013 |
| CA | 2815067 | | 11/2013 |
| CA | 2848289 | A1 | 10/2014 |
| CA | 2998173 | | 7/2018 |
| CN | 2182475 | Y | 11/1994 |
| CN | 1309618 | A | 8/2001 |
| CN | 201059503 | Y | 5/2008 |
| CN | 201259125 | Y | 6/2009 |
| CN | 101608781 | A | 12/2009 |
| CN | 201636626 | U | 11/2010 |
| CN | 102062373 | A | 5/2011 |
| CN | 202014067 | U | 10/2011 |
| CN | 202392473 | U | 8/2012 |
| CN | 202733693 | U | 2/2013 |
| CN | 103307518 | A | 9/2013 |
| CN | 103322476 | A | 9/2013 |
| CN | 203202661 | U | 9/2013 |
| CN | 203215483 | U | 9/2013 |
| CN | 101498411 | B | 11/2013 |
| CN | 203273663 | U | 11/2013 |
| CN | 203297980 | U | 11/2013 |
| CN | 203628464 | U | 6/2014 |
| CN | 203641919 | U | 6/2014 |
| CN | 204300818 | U | 4/2015 |
| CN | 104654142 | A | 5/2015 |
| CN | 204513161 | U | 7/2015 |
| CN | 204611541 | U | 9/2015 |
| CN | 204786225 | U | 11/2015 |
| CN | 204829578 | U | 12/2015 |
| CN | 103712135 | B | 4/2016 |
| CN | 205606362 | U | 9/2016 |
| CN | 206130742 | U | 4/2017 |
| CN | 103154606 | B | 5/2017 |
| CN | 206222112 | U | 6/2017 |
| CN | 304220113 | | 7/2017 |
| CN | 107013845 | A | 8/2017 |
| CN | 107084343 | A | 8/2017 |
| DE | 9109828 | U1 | 2/1992 |
| DE | 199 47 208 | | 5/2001 |
| EP | 1 589 289 | | 10/2005 |
| EP | 1 672 155 | A1 | 6/2006 |
| EP | 1688663 | A2 | 8/2006 |
| EP | 2 095 938 | A1 | 9/2009 |
| EP | 2 306 072 | A1 | 4/2011 |
| EP | 2 453 169 | A2 | 5/2012 |
| EP | 2 193 309 | B1 | 7/2012 |
| EP | 2 735 787 | A1 | 5/2014 |
| EP | 3 104 024 | A1 | 12/2016 |
| GB | 2325728 | A | 12/1998 |
| GB | 2427020 | A | 12/2006 |
| GB | 2466875 | A | 7/2010 |
| GB | 2471929 | A | 1/2014 |
| GB | 2509772 | A | 7/2014 |
| JP | H02113002 | U | 9/1990 |
| JP | 2007091052 | A | 4/2007 |
| JP | 2007265961 | A | 10/2007 |
| JP | 2011060450 | A2 | 3/2011 |
| JP | 2012064551 | A2 | 3/2012 |
| JP | 2015002027 | A2 | 1/2015 |
| JP | 2015002028 | A2 | 1/2015 |
| JP | 2016219335 | A | 12/2016 |
| JP | 2017107699 | A2 | 6/2017 |
| JP | D1658938 | | 4/2020 |
| KR | 1020110008796 | A | 1/2011 |
| KR | 1020120061625 | A | 6/2012 |
| MX | 2011002947 | A | 9/2011 |
| PH | 3-2018-658-0001 | | 7/2018 |
| TW | 474382 | U | 1/2002 |
| WO | WO D038920-001 | | 1/1997 |
| WO | WO 2013/128896 | A1 | 9/2013 |
| WO | WO 2015/000212 | A1 | 1/2015 |
| WO | WO 2016152166 | A2 | 9/2016 |

OTHER PUBLICATIONS

Final Office Action dated Oct. 12, 2023 from U.S. Appl. No. 17/723,370, 25 Pages.

Non-Final Office Action dated Oct. 16, 2023 from U.S. Appl. No. 17/694,489, 17 Pages.

Non-Final Office Action dated Oct. 23, 2023 from U.S. Appl. No. 17/381,147, 4 Pages.

2006 International Building Code, Section 712 Penetrations, Jan. 2006, 4 pages.

Acrich COB Zhaga Module, Product Description, Seoul Semiconductor, Nov. 11, 2016, 39 pages.

<https://www.zhagastandard.org/books/book18/>, Mar. 2017, 5 pages. Accessed on May 14, 2018.

BXUV.GuideInfo, Fire Resistance Ratings—ANSI/UL 263, UL Online Certifications Directory, last updated Nov. 3, 2016, 27 pages.

CEYY.GuideInfo, Outlet Boxes and Fittings Certified for Fire Resistance, UL Online Certifications Directory, last updated May 16, 2013, 2 pages.

Canadian Office Action dated Dec. 23, 2013 from Canadian Application No. 2,778,581, 3 pages.

Canadian Office Action dated Mar. 22, 2016 from Canadian Application No. 2,879,629, 4 pages.

(56) References Cited

OTHER PUBLICATIONS

Canadian Office Action dated Dec. 6, 2016 from Canadian Application No. 2,879,629, 3 pages.
Canadian Office Action dated Mar. 9, 2017 from Canadian Application No. 2,931,588, 5 pages.
Canadian Office Action dated Feb. 1, 2016 from Canadian Application No. 2,879,486, 5 pages.
Canadian Office Action dated Jun. 12, 2017 from Canadian Application No. 2,927,601, 4 pages.
Canadian Office Action dated Aug. 11, 2017 from Canadian Application No. 2,941,051, 4 pages.
Cree LED Lamp Family Sales Sheet—Better light is beautiful light , Apr. 24, 2017, 2 pages.
DME Series Installation Instructions, Oct. 18, 2011, 2 pages.
DMF, Inc., "dmfLIGHTING: LED Recessed Lighting Solutions," Info sheets, Mar. 15, 2012, 4 pages.
DMF, Inc., "dmfLIGHTING: LED Recessed Downlighting," DRD2 Product Brochure, Oct. 23, 2014, 50 pages.
DMF, Inc., "dmfLIGHTING: LED Recessed Downlighting," Product Catalog, Aug. 2012, 68 pages.
Halo, Halo LED H4 H7 Collection, SustainabLEDesign, Cooper Lighting, (emphasis on p. 18 "H7 Collection LED Modules—Halo LED H7 Module Features,") Mar. 28, 2012, 52 pages.
Halo, H7 LED Downlight Trims 49x Series, 6-inch LED Trims for Use with MI7x LED Modules, Cooper Lighting, ADV110422, rev. Aug. 12, 2011, 15 pages.
Halo, LED Module ML706x, Cooper Lighting, General Installation for All Modules/p. 1; Tether Installation/pp. 2-3; Installation into Halo H750x Series LED—only (Non-Screw Based), Recessed Fixture, p. 4, Oct. 20, 2009, 4 pages.
"Membrane Penetrations in Fire-Resistance Rated Walls," https://www.ul.com/wp-content/uploads/2014/04/ul_MembranePenetrations.pdf, Issue 1, 2009, published Feb. 26, 2010, 2 pages.
"Metallic Outlet Boxes," UL 514A, Underwriters Laboratories, Inc., Feb. 16, 2004 (Title Page Reprinted Aug. 10, 2007), 106 pages.
"Metallic and Non-metallic Outlet Boxes Used in Fire-rated Assembly," https://iaeimagazine.org/magazine/2000/09/16/metallic-and-non-metallic-outlet-boxes-used-in-fire-rated-assembly/, Sep. 16, 2000, 5 pages.
Notice of Allowance dated Aug. 23, 2017 from Canadian Application No. 2,879,629, 1 page.
"Outlet Boxes for Use in Fire Rated Assemblies," https://www.ul.com/wp-content/uploads/2014/04/UI_outletboxes.pdf, Apr. 2007, 2 pages.
"Advanced LED Solutions," Imtra Marine Lighting. Jun. 17, 2011, 40 pages.
"Portland Bi-Color, Warm White/Red," item:ILIM30941.Imtra Marine Products. 2012. 3 pages. Accessed athttp://www.imtra.com:80/0ade25fb-3218-4cae-a926-6abe64ffd93a/lighting-light-fixtures-downlights-3-to-4-inches-detail.htm on Jan. 25, 2013.
"Cree LMH2 LED Modules," Mouser Electronics. Accesssed at www.mouser.com/new/cree/creelmh2 on Sep. 9, 2012. 2 pages.
"Cree LMH2 LED Module with TrueWhite Technology," Cree Product Family Data Sheet. Dec. 21, 2011. 3 pages.
"Cree LMH2 LED Modules Design Guide," Cree Product Design Guide. 2011. 20 pages.
"Undercabinet Pucks, Xyris Mini LED Puck Light," ELCO Lighting. Sep. 2018. 1 page.
"LED Undercabinet Pocket Guide," ELCO Lighting. Nov. 2, 2016. 12 pages.
"Versi LED Mini Flush," Lithonia Lghting. Sep. 2013. 6 pages.
OneFrame Recessed LED Downlight. Dmflighting.com. Published Jun. 6, 2018. Retrieved at https://www.dmflighting.com/product/oneframe on Jun. 6, 2018. 11 pages.
International Search Report and Written Opinion in PCT/US2018/048357 dated Nov. 14, 2018, 13 pages.
International Search Report and Written Opinion in International Patent Application No. PCT/US18/39048 dated Dec. 14, 2018. 24 pages.
RACO 4 i+A882:C958n. Octagon Welded Concrete Ring, 3½ in. Deep with ½ and ¾ in. Knockouts and ilcludes 890 cover (20-Pack). Model # 280. Accessed at https://www.homedepot.com/p/RACO-4-in-Octagon-Welded-Concrete-Ring-3-1-2-in-Deep-with-1-2-and-3-4-in-Knockouts-and-ilcludes-890-cover-20-Pack-280/203638679 on Jan. 18, 2019. 3 pages.
RACO 4 in. Octagon Welded Concrete Ring, 6 in. Deep with ½ and ¾ in. Knockouts (10-Pack). Model # 276. Accessed at https://www.homedepot.com/p/RACO-4-in-Octagon-Welded-Concrete-Ring-6-in-Deep-with-1-2-and-3-4-in-Knockouts-10-Pack-276/203638675 on Jan. 16, 2019. 4 pages.
International Search Report and Written Opinion in International Patent Application No. PCT/US18/62868 dated Mar. 14, 2019, 13 pages.
CS&E PCT Collaborative Search and Examination Pilot Upload Peer Contribution in International Patent Application No. PCT/US18/62868 dated Mar. 14, 2019, 61 pages.
International Search Report and Written Opinion in International Patent Application No. PCT/US18/67614 dated Apr. 25, 2019, 20 pages.
CS&E PCT Collaborative Search and Examination Pilot Upload Peer Contribution in International Patent Application No. PCT/US18/67614 dated Apr. 24, 2019, 53 pages.
Specification & Features 4" Octagonal Concrete Box Covers. Orbit Industries, Inc. Accessed at https://www.orbitelectric.com on May 6, 2019. 1 page.
4" Octagon Concrete Boxes and Back Plates. Appleton. Accessed at www.appletonelec.com on May 6, 2019. 1 page.
RACO Commercial, Industrial and Residential Electrical Products. Hubbell. Accessed at www.Hubbell-RTB.com on May 6, 2019. 356 pages.
Imtra Marine Lighting 2008 Catalog. 40 pages.
Imtra Marine Lighting 2009 Catalog. 32 pages.
Imtra Marine Lighting Spring 2007 Catalog. 36 pages.
Cooper Lighting Halo ML56 LED System Product Sheet. Mar. 2, 2015. Accessed at http://www.cooperindustries.com/content/dam/public/lighting/products/documents/halo/spec_sheets/halo-ml56600-80cri-141689-sss.pdf. 8 pages.
Kwikbrace® New Construction Braces for Lighting Fixtures or Ceiling Fans 1½ in. Depth. Hubbel. Accessed at https://hubbellcdn.com/specsheet/926.pdf on Jun. 27, 2019. 1 page.
IC1JB Housing 4" IC-Rated New Construction Junction Box Housing. AcuityBrands. Accessed at https://www.acuitybrands.com/en/products/detail/845886/juno/ic1jb-housing/4-ic-rated-new-construction-junction-box-housing on Jun. 27, 2019, 4 pages.
International Search Report and Written Opinion in International Patent Application No. PCT/US19/32281 dated Aug. 2, 2019, 18 pages.
Delhi Rehab & Nursing Facility ELM16-70884. Vertex Innovative Solutions Feb. 25, 2016. 89 pages.
SlimSurface surface mount downlighting. Philips Lightolier 2018. 8 pages.
Be seen in the best light. Lightolier by signify. Comprehensive 2019 Lighting Catalog. 114 pages.
Cree® LMR2 LED Module. Product Family Data Sheet Cree 2011. 3 pages.
International Search Report and Written Opinion in International Patent Application No. PCT/US2019/036477 dated Oct. 17, 2019, 15 pages.
ML56 LED Lighting System 600 / 900 / 1200 Series Halo. Cooper Lighting Brochure 2015. Accessed at https://images.homedepot-static.com/catalog/pdfImages/06/06d28f93-4bf6-45be-a35a-a0239606f227.pdf. 41 pages.
Switch and Outlet Boxes and Covers Brochure. Appelton 2010. 77 pages.
Maxim Lighting Wafer Trifold Brochure LMXBRO1711 2017. Accessed at https://www.maximlighting.com/Upload/download/brochure/pdf/LMXBRO1711.pdf on Feb. 13, 2020. 2 pages.
Maxim Convert Fixture. LMXCAT1805 Maxim Main Catalog 2018 p. 639.
Maxim Wafer. LMXCAT1805 Maxim Main Catalog 2018 pp. 636-638.

(56) References Cited

OTHER PUBLICATIONS

Maxim Lighting Trim Trifold LMXBRO1905 2019. Accessed at https://www.maximlighting.com/Upload/download/brochure/pdf/LMXBRO1905.pdf on Feb. 13, 2020. 2 pages.
International Search Report and Written Opinion in International Patent Application No. PCT/US2019/054220 dated Feb. 24, 2020, 23 pages.
LED Book Price Guide 2012. DMF Light. Issued Jun. 26, 2013. 3 pages.
DLER411 4" Recessed LED Retrofit Module. DMF Light. Issued Jun. 15, 2011. 1 page.
DLEI411 4" Recessed LED New Construction, IC. DMF Light. Issued Nov. 30, 2011. 1 page.
DLEIR411 4" Recessed LED Remodel, IC. DMF Light. Issued Jun. 15, 2011. 1 page.
3 & 4" DLE Ser ies LED Sample Case Now Available. DMF Light. Issued Jan. 6, 2012. 1 page.
DLEI3 3" Recessed LED New Construction, IC. DMF Light. Issued Nov. 30, 2011. 2 pages.
Ridgway-Barnes, SlimSurface LED Downlight: One of the thinnest LED surface mount downlights in the market. Philips Lighting Blog. Oct. 28, 2014. Accessed at http://applications.nam.lighting.philips.com/blog/index.php/2014/10/28/slimsurface-led-downlight-one-of-the-thinnest-led-surface-mount-downlights-in-the-market/. 3 pages.
SlimSurface LED S5R, S7R & S10R Round 5", 7" and 10" Apertures. Lightolier by Signify. Nov. 2018. 9 pages.
Maxim Lighting International, "Wafer LED 7" RD 3000K Wall/Flush Mount", undated. 1 page.
Maxim Lighting International, "Convert LED Flush Mount", undated. 1 page.
Maxim Lighting International, "Views of the Wafer Flush Mount", undated. 1 page.
Maxim Lighting International, "Product/Drawing Specification Sheet" undated. 1 page.
International Search Report and Written Opinion in PCT/US2020/017331 dated Jun. 22, 2020, 16 pages.
Taiwan Office Action and translation thereof dated Jun. 12, 2020 from Taiwan Application No. 108116564, 8 pages.
Access Lighting Installation Instructions. No. 20870LEDD/20871LEDD/20872LEDD. Dec. 16, 2019. 2 pages.
Model No. 20870LEDD-WH/ACR Infinite Specification Sheet. Access Lighting. Apr. 9, 2020. 1 page.
Dmf DRD2 Recessed LED Downlight General Retrofit Junction Box Dated: Dec. 18, 2015 Downloaded Jul. 28, 2018, from https://www.a lconlighting.com/specsheets/DMF/DRD2-Junction-Box-Retrofit-Spec-Sheet .pdf, 6 pages.
Dmf DRD2 Recessed LED Downlight General New Construction 4", 5", 6" Aperture Dated Aug. 31, 2016 Downloaded Jul. 28, 2018, from https://www. cansandfans.com/sites/default/files/DRD2-General-New-Construction-Spec-Sheet_7_0 .pdf , 9 pages.
Mar. 5, 2016—The DMF Lighting DRD2 Recessed LED Downlight General Retrofit Junction Box—Wet Location Rated is the ideal solution for Commercial LED recessed lighting retrofit applications. web cache https://ww w.alconlighting.com/dmf-drd2m.html (downloaded Jul. 28, 2018), 6 pages.
LED modules advance in performance, standardization questions persist (Magazine). LEDs Magazine. Oct. 29, 2013. Accessed at https://www.ledsmagazine.com/leds-ssl-design/modular-light-engines/article/16695073/led-modules-advance-in-performance-standardization-questions-persist-magazine. 9 pages.
Octagon Concrete Box Cover with 3½ in. & 2¾ in. Conduit Knockouts. Garvin. Accessed at https://www.garvinindustries.com/covers-and-device-rings/concrete-slab-box-covers-adaptor-rings/flat-covers-all-styles/cbp?gclid=Cj0KCQjw9b_4BRCMARIsADMUIyp Jc0K80UHdDTI9C5m4BDzR3U87PRYV1NdQIBFxEWQ21_3otTCTqEkaAi_DEALw_wcB on Jul. 20, 2020. 1 page.
Canadian Office Action in Application No. 2931588 dated Aug. 13, 2020, 5 pages.
International Search Report and Written Opinion in PCT/US2020/050767 dated Dec. 9, 2020, 25 pages.
Canadian Office Action in Application No. 2941051 dated Dec. 8, 2020, 5 pages.
"Electrical Boxes" accessed at http://electrical-inspector.blogspot.com/2013/06/electrical-boxes.html Jun. 22, 2013 retrieved from Wayback Machine Archive.org on Jan. 25, 2021. 12 pages.
"Electrical Boxes Volume and Fill Calculations" accessed at http://electrical-inspector.blogspot.com/2013/06/electrical-boxes-Volume-and-Fill-Calculations.html Jun. 22, 2013 retrieved from Wayback Machine Archive.org on Jan. 25, 2021. 8 pages.
U.S. Appl. No. 61/881,162, filed Sep. 23, 2013. Priority application to US Publication No. 2015/0085500 to Cooper et al. 31 pages.
Thiele, Plastic Electrical Boxes Pros and Cons. Dated Jul. 1, 2019. Accessed at found at https://www.thespruce.com/plastic-electrical-boxes-pros-and-cons-1152405. 1 page.
"Electrical Box" reference dated Mar. 23, 2021. Accessed at https://www.zoro.com/cantex-electrical-box-3-12-in-rouond-20-cu-in-ez20cnr-/i/G1823376/. 1 page.
"12 Pack" reference by Hykolity on Amazon.com, date first available Nov. 7, 2019 [online], available from internet URL: https://www.amazon.com/dp/B081655CDL/ref=cm_sw_em_r_mt_dp_8NAZD4R3MTTP59290SG3?_encoding=UTF8&th=1 (Year: 2019) (6 pages).
"Halo" reference by Amazon.com, date first available Aug. 4, 2017 [online], site visited Jan. 31, 2022, available from internet URL: https:// www.amazon.com/dp/B074K234DL/ref=cm_sw_em_r_mt_dp_P7H78BZ413RNSQ55NVTR (Year: 2013) (6 pages).
"Juno Lighting" reference by Express Electric on Amazon.com, date first available Feb. 14, 2008 [online], site visited Jan. 31, 2022, available from internet URL: https://www.amazon.com/Juno-Lighting-TC44R-Retrofit-Downlight/dp/BOOOOD12HT/ref=psdc_6355949011_t2_B078X1D488?th=1 (Year: 2008) (6 pages).
"Sunco Lighting" reference by Sunco Lighting on Amazon.com, date first available Sep. 21, 2018 [online], site visited Jan. 31, 2022, available from internet URL: https://www.amazon.com/Sunco-Lighting-Construction-Downlight-Electrician/dp/B07D92B5DL?th=1 ( Year: 2018) (6 pages).
Canadian Notice of Allowance dated Nov. 23, 2022 from Canadian Application No. 3,102,022, 1 Page.
Canadian Office Action dated Dec. 19, 2022 from Canadian Application No. 3,135,470, 5 pages.
Canadian Office Action dated Dec. 16, 2022 from Canadian Application No. 3,130,524, 6 pages.
Chinese Office Action and English Translation in Chinese Application No. CN 202210354716.6, dated Jul. 29, 2023, 13 pages.
Canadian Office Action in Canadian Application No. CA 3,135,470, dated Jul. 27, 2023, 4 pages.
Whaling Museum Chooses Imtra LED Lighting for Popular Exhibit, LEDs Magazine Sep. 17, 2010; https://www.ledsmagazine.com/company-newsfeed/article/16690837/whaling-museum-chooses-imtra-led-lighting-for-popular-exhibit, 3 pages.
Imtra supplied its LED lighting to USA. Whaling Museum; LEDinside, Sep. 20, 2010, https://www.ledinside.com/news/2010/9/news_Imtra_LED_20100920, 1 page.
Final Office Action dated Apr. 27, 2016 from U.S. Appl. No. 14/184,601, 19 pages.
Final Office Action dated Jul. 26, 2017 from U.S. Appl. No. 14/184,601, 18 pages.
Final Office Action dated Jan. 29, 2016 from U.S. Appl. No. 14/183,424, 21 pages.
Final Office Action dated Jun. 23, 2016 from U.S. Appl. No. 13/484,901, 18 pages.
Final Office Action dated Apr. 2, 2015 from U.S. Appl. No. 13/484,901, 13 pages.
Notice of Allowance dated Mar. 26, 2018 for U.S. Appl. No. 14/184,601, 10 pages.
Non-Final Office Action dated Mar. 15, 2010 from U.S. Appl. No. 12/100,148, 8 pages.
Non-Final Office Action dated Apr. 30, 2010 from U.S. Appl. No. 12/173,232, 13 pages.
Non-Final Office Action dated Sep. 5, 2014 from U.S. Appl. No. 13/791,087, 8 pages.

(56) References Cited

OTHER PUBLICATIONS

Non-Final Office Action dated Jul. 20, 2015 from U.S. Appl. No. 14/184,601, 16 pages.
Non-Final Office Action dated Dec. 15, 2016 from U.S. Appl. No. 14/184,601, 18 pages.
Non-Final Office Action dated Feb. 6, 2018 from U.S. Appl. No. 15/167,682, 9 pages.
Non-Final Office Action dated Sep. 15, 2015 from U.S. Appl. No. 13/484,901, 16 pages.
Non-Final Office Action dated Oct. 16, 2014 from U.S. Appl. No. 13/484,901, 11 pages.
Non-Final Office Action dated Sep. 6, 2017 from U.S. Appl. No. 14/726,064, 8 pages.
Non-Final Office Action dated May 17, 2017 from U.S. Appl. No. 14/183,424, 20 pages.
Non-Final Office Action dated Jun. 2, 2015 from U.S. Appl. No. 14/183,424, 20 pages.
Non-Final Office Action dated Apr. 12, 2018 for U.S. Appl. No. 29/638,259, 5 pages.
Non-Final Office Action dated May 16, 2018 for U.S. Appl. No. 15/132,875, 18 pages.
Notice of Allowance dated Jan. 30, 2015 from U.S. Appl. No. 13/791,087, 9 pages.
Notice of Allowance dated Jan. 16, 2015 from U.S. Appl. No. 29/467,026, 9 pages.
Notice of Allowance dated Oct. 21, 2016 from U.S. Appl. No. 13/484,901, 7 pages.
Notice of Allowance dated Mar. 24, 2016 from U.S. Appl. No. 14/247,149, 8 pages.
Notice of Allowance dated May 22, 2018 from U.S. Appl. No. 14/183,424, 9 pages.
Notice of Allowance dated May 10, 2018 from U.S. Appl. No. 14/726,064, 7 pages.
Notice of Allowance dated Sep. 21, 2018 from U.S. Appl. No. 29/645,941, 5 pages.
Notice of Allowance dated Oct. 4, 2018 from U.S. Appl. No. 15/947,065 , 9 pages.
Notice of Allowance dated Sep. 19, 2018 from U.S. Appl. No. 15/167,682 , 7 pages.
Non-Final Office Action dated Jun. 25, 2018 for U.S. Appl. No. 29/541,565, 10 pages.
Non-Final Office Action dated Oct. 24, 2018 for U.S. Appl. No. 15/688,266, 14 pages.
Notice of Allowance dated Oct. 9, 2018 from U.S. Appl. No. 29/653,142, 7 pages.
Notice of Allowance dated Nov. 27, 2018 from U.S. Appl. No. 15/167,682, 11 pages.
Non-Final Office Action dated Dec. 5, 2018 from U.S. Appl. No. 14/942,937, 13 pages.
Notice of Allowance dated Jan. 2, 2019 from U.S. Appl. No. 29/541,565, 6 pages.
Notice of Allowance dated Feb. 8, 2019 from U.S. Appl. No. 29/541,565, 5 pages.
Non-Final Office Action dated Feb. 7, 2019 from U.S. Appl. No. 16/200,393, 32 pages.
Notice of Allowance dated Jan. 28, 2019 from U.S. Appl. No. 29/664,471, 8 pages.
Non-Final Office Action dated Jul. 24, 2018 from U.S. Appl. No. 29/638,259, 5 pages.
Final Office Action dated Mar. 15, 2019 from U.S. Appl. No. 15/132,875, 15 pages.
Notice of Allowance dated Apr. 1, 2019 from U.S. Appl. No. 15/167,682, 7 pages.
Non-Final Office Action dated Apr. 4, 2019 from U.S. Appl. No. 29/678,482, 8 pages.
Notice of Allowance dated Apr. 8, 2019 from U.S. Appl. No. 29/653,142, 8 pages.
Notice of Allowance dated Apr. 17, 2019 from U.S. Appl. No. 29/678,478, 7 pages.
Final Office Action dated Jun. 6, 2019 from U.S. Appl. No. 15/688,266, 7 pages.
Non-Final Office Action dated Jun. 11, 2019 from U.S. Appl. No. 15/901,738, 6 pages.
Notice of Allowance dated Jun. 12, 2019 from U.S. Appl. No. 16/016,040, 8 pages.
Ex-Parte Quayle Action dated Jun. 27, 2019 from U.S. Appl. No. 29/683,730, 5 pages.
Notice of Allowance dated Jul. 31, 2019 from U.S. Appl. No. 15/167,682 , 7 pages.
Supplemental Notice of Allowance dated Aug. 5, 2019 from U.S. Appl. No. 15/947,065, 2 pages.
Notice of Allowance dated Sep. 11, 2019 from U.S. Appl. No. 29/653,142, 6 pages.
Notice of Allowance dated Sep. 19, 2019 from U.S. Appl. No. 16/016,040, 7 pages.
Corrected Notice of Allowance dated Sep. 27, 2019 from U.S. Appl. No. 15/167,682 , 2 pages.
Final Office Action dated Sep. 27, 2019 from U.S. Appl. No. 16/200,393, 34 pages.
Notice of Allowance dated Feb. 15, 2019 from U.S. Appl. No. 15/947,065, 9 pages.
Notice of Allowance dated Oct. 1, 2019 from U.S. Appl. No. 14/942,937, 7 pages.
Final Office Action dated Oct. 3, 2019 from U.S. Appl. No. 29/678,482, 6 pages.
Corrected Notice of Allowance dated Oct. 10, 2019 from U.S. Appl. No. 16/016,040, 2 pages.
Notice of Allowance dated Oct. 16, 2019 from U.S. Appl. No. 15/132,875, 12 pages.
Non-Final Office Action dated Dec. 30, 2019 from U.S. Appl. No. 16/653,497, 8 pages.
Notice of Allowance dated Feb. 5, 2020 from U.S. Appl. No. 15/901,738, 8 pages.
Notice of Allowance dated Feb. 5, 2020 from U.S. Appl. No. 29/678,482, 13 pages.
Final Office Action dated Mar. 17, 2020 for U.S. Appl. No. 29/653,142, 13 pages.
Non-Final Office Action dated Apr. 2, 2020 for U.S. Appl. No. 16/522,275, 21 pages.
Notice of Allowance dated May 18, 2020 from U.S. Appl. No. 15/901,738, 7 pages.
Non-Final Office Action dated May 20, 2020 for U.S. Appl. No. 15/688,266, 6 pages.
Non-Final Office Action dated May 26, 2020 for U.S. Appl. No. 16/719,361, 10 pages.
Notice of Allowance dated Apr. 9, 2020 from U.S. Appl. No. 16/653,497, 7 pages.
Notice of Allowance dated Jul. 10, 2020 from U.S. Appl. No. 29/694,475, 6 pages.
Corrected Notice of Allowability dated Oct. 25, 2018 from U.S. Appl. No. 14/183,424, 3 pages.
Ex Parte Quayle Office Action dated Oct. 16, 2018 for U.S. Appl. No. 29/663,037, 7 pages.
Notice of Allowance dated Nov. 19, 2018 from U.S. Appl. No. 29/663,037, 5 pages.
Notice of Allowance dated Nov. 15, 2018 from U.S. Appl. No. 29/663,040, 5 pages.
Notice of Allowance dated Jul. 20, 2020 from U.S. Appl. No. 29/648,046, 5 pages.
Notice of Allowance dated Jul. 28, 2020 from U.S. Appl. No. 16/719,361, 8 pages.
Notice of Allowance dated Jul. 29, 2020 from U.S. Appl. No. 16/522,275, 8 pages.
Non-Final Office Action dated Aug. 19, 2020 for U.S. Appl. No. 16/886,365, 16 pages.
Notice of Allowance dated Sep. 8, 2020 from U.S. Appl. No. 29/678,482, 5 pages.
Corrected Notice of Allowance dated Sep. 11, 2020 from U.S. Appl. No. 16/719,361, 2 pages.
Corrected Notice of Allowance dated Sep. 14, 2020 from U.S. Appl. No. 16/522,275, 2 pages.

(56) References Cited

OTHER PUBLICATIONS

Notice of Allowance dated Sep. 22, 2020 from U.S. Appl. No. 29/683,730, 6 pages.
Notice of Allowance dated Sep. 22, 2020 from U.S. Appl. No. 29/653,142, 6 pages.
Notice of Allowance dated Oct. 27, 2020 from U.S. Appl. No. 29/648,046, 5 pages.
Notice of Allowance dated Oct. 27, 2020 from U.S. Appl. No. 29/694,475, 5 pages.
Notice of Allowance dated Nov. 10, 2020 from U.S. Appl. No. 29/688,143, 6 pages.
Notice of Allowance dated Nov. 10, 2020 from U.S. Appl. No. 29/688,172, 6 pages.
Non-Final Office Action dated Nov. 30, 2020 from U.S. Appl. No. 17/000,702, 7 pages.
Notice of Allowance dated Dec. 2, 2020 from U.S. Appl. No. 29/746,262, 6 pages.
Non-Final Office Action dated Dec. 16, 2020 from U.S. Appl. No. 17/080,080, 28 pages.
Final Office Action dated Jan. 11, 2021 from U.S. Appl. No. 15/688,266, 7 pages.
Non-Final Office Action dated Jan. 11, 2021 from U.S. Appl. No. 16/725,606, 7 pages.
Non-Final Office Action dated Jan. 13, 2021 from U.S. Appl. No. 17/085,636, 14 pages.
Notice of Allowance dated Jan. 15, 2021 from U.S. Appl. No. 17/000,702, 7 pages.
Notice of Allowance dated Jan. 22, 2021 from U.S. Appl. No. 17/080,080, 14 pages.
Notice of Allowance dated Jan. 22, 2021 from U.S. Appl. No. 16/886,365, 7 pages.
Final Office Action dated Feb. 5, 2021 from U.S. Appl. No. 16/200,393, 7 pages.
Non-Final Office Action dated Jan. 19, 2021 from U.S. Appl. No. 17/099,650, 15 pages.
Supplemental Notice of Allowance dated Mar. 10, 2021 from U.S. Appl. No. 16/886,365, 2 pages.
Notice of Allowance dated Apr. 6, 2021 from U.S. Appl. No. 16/200,393, 11 pages.
Non-Final Office Action dated Apr. 12, 2021 from U.S. Appl. No. 29/694,475, 11 pages.
Notice of Allowance dated Apr. 13, 2021 from U.S. Appl. No. 16/725,606, 7 pages.
Notice of Allowance dated Apr. 26, 2021 from U.S. Appl. No. 17/080,080, 11 pages.
Corrected Notice of Allowance dated Apr. 28, 2021 from U.S. Appl. No. 16/725,606, 2 pages.
Notice of Allowance dated May 5, 2021 from U.S. Appl. No. 17/085,636, 8 pages.
Notice of Allowance dated May 14, 2021 from U.S. Appl. No. 16/881,686, 8 pages.
Notice of Allowance dated May 17, 2021 from U.S. Appl. No. 15/688,266, 9 pages.
Notice of Allowance dated May 24, 2021 from U.S. Appl. No. 29/688,143, 6 pages.
Notice of Allowance dated May 24, 2021 from U.S. Appl. No. 29/688,172, 6 pages.
Notice of Allowance dated May 27, 2021 from U.S. Appl. No. 16/779,865, 9 pages.
Notice of Allowance dated May 28, 2021 from U.S. Appl. No. 16/779,824, 11 pages.
Notice of Allowance dated Jun. 1, 2021 from U.S. Appl. No. 16/719,361, 7 pages.
Corrected Notice of Allowance dated Jun. 21, 2021 from U.S. Appl. No. 16/779,865, 3 pages.
Non-Final Office Action dated Jul. 14, 2021 from U.S. Appl. No. 17/118,742, 11 pages.
Notice of Allowance dated Jul. 21, 2021 from U.S. Appl. No. 17/318, 13 pages.
Supplemental Notice of Allowance dated Aug. 13, 2021 1 from U.S. Appl. No. 16/779,824, 3 pages.
Supplemental Notice of Allowance dated Aug. 19, 2021 1 from U.S. Appl. No. 17/318,193, 4 pages.
Notice of Allowance dated Aug. 20, 2021 1 from U.S. Appl. No. 29/764,875, 5 pages.
Notice of Allowance dated Sep. 16, 2021 from U.S. Appl. No. 16/779,865, 9 pages.
Non-Final Office Action dated Oct. 18, 2021 from U.S. Appl. No. 29/696,830, 8 pages.
Notice of Allowance dated Nov. 3, 2021 from U.S. Appl. No. 17/220,779, 7 pages.
Notice of Allowance dated Nov. 5, 2021 1 from U.S. Appl. No. 17/318,193, 11 pages.
Non-Final Office Action dated Nov. 5, 2021 from U.S. Appl. No. 17/379,748, 8 pages.
Notice of Allowance dated Nov. 8, 2021 1 from U.S. Appl. No. 29/764,875, 5 pages.
Non-Final Office Action dated Nov. 15, 2021 from U.S. Appl. No. 17/374,674, 7 pages.
Final Office Action dated Nov. 16, 2021 from U.S. Appl. No. 17/099,650, 14 pages.
Notice of Allowance dated Nov. 22, 2021 from U.S. Appl. No. 29/694,475, 7 pages.
Notice of Allowance dated Nov. 24, 2021 from U.S. Appl. No. 17/234,421, 9 pages.
Non-Final Office Action dated Nov. 30, 2021 from U.S. Appl. No. 17/395,522, 28 pages.
Non-Final Office Action dated Dec. 1, 2021 from U.S. Appl. No. 16/883,144, 23 pages.
Corrected Notice of Allowance dated Dec. 10, 2021 from U.S. Appl. No. 17/234,421, 2 pages.
Non-Final Office Action dated Dec. 13, 2021 from U.S. Appl. No. 29/711,198, 8 pages.
Corrected Notice of Allowance dated Jan. 11, 2022 from U.S. Appl. No. 29/694,475, 2 pages.
Corrected Notice of Allowance dated Jan. 12, 2022 from U.S. Appl. No. 16/779,865, 9 pages.
Non-Final Office Action dated Jan. 21, 2022 from U.S. Appl. No. 17/229,668, 5 pages.
Notice of Allowance from U.S. Appl. No. 17/379,748 dated Feb. 16, 2022, 5 pages.
Non-Final Office Action dated Feb. 16, 2022 from U.S. Appl. No. 29/743,066, 6 pages.
Notice of Allowance dated Feb. 14, 2022 from U.S. Appl. No. 17/473,934, 9 pages.
Non-Final Office Action dated Feb. 25, 2022 from U.S. Appl. No. 17/384,564 28 pages.
Notice of Allowance dated Mar. 11, 2022 from U.S. Appl. No. 17/118,742 13 pages.
Notice of Allowance dated Apr. 27, 2022 from U.S. Appl. No. 16/883,144, 11 pages.
Notice of Allowance dated Apr. 27, 2022 from U.S. Appl. No. 17/374,674, 7 pages.
Notice of Allowance dated Apr. 27, 2022 from U.S. Appl. No. 17/473,934, 9 pages.
Notice of Allowance dated Jun. 7, 2022 from U.S. Appl. No. 29/683,638, 7 pages.
Non-Final Office Action dated Jun. 20, 2022 from U.S. Appl. No. 17/381,147, 4 Pages.
Non-Final Office Action dated Jun. 22, 2022 from U.S. Appl. No. 29/759,492, 6 Pages.
Notice of Allowance dated Jul. 11, 2022 from U.S. Appl. No. 29/696,830, 5 Pages.
Final Office Action dated Jul. 11, 2022 from U.S. Appl. No. 29/711,198 , 7 Pages.
Non-Final Office Action dated Oct. 25, 2022 from U.S. Appl. No. 17/099,650, 10 Pages.
Final Office Action dated Dec. 15, 2022 from U.S. Appl. No. 29/743,066, 16 pages.
Supplemental Notice of Allowance dated Jan. 17, 2023 from U.S. Appl. No. 17/384,564 2 pages.

(56) References Cited

OTHER PUBLICATIONS

Office Action dated Jan. 24, 2023 from U.S. Appl. No. 17/677,300, 5 pages.
Notice of Allowance dated Mar. 1, 2023 from U.S. Appl. No. 29/711,198, 7 pages.
Non-Final Office Action dated Mar. 17, 2023 from U.S. Appl. No. 17/723,370, 5 pages.
Non-Final Office Action dated Mar. 23, 2023 from U.S. Appl. No. 17/694,489, 9 pages.
Notice of Allowance dated Mar. 29, 2023 from U.S. Appl. No. 17/666,441, 9 pages.
Notice of Allowance dated Apr. 10, 2023 from U.S. Appl. No. 29/743,066, 7 pages.
Final Office Action dated Apr. 12, 2023 from U.S. Appl. No. 29/759,492, 8 Pages.
Non-Final Office Action dated May 8, 2023 from U.S. Appl. No. 17/677,300 , 7 Pages.
Non-Final Office Action dated Aug. 31, 2023 from U.S. Appl. No. 17/379,489, 11 Pages.
Petition for Inter Partes Review of U.S. Pat. No. 9,964,266 Pursuant to 37 C.F.R. § 42.100 et seq. *AMP Plus Inc. dbd ELCO Lighting* v. *DMF, Inc*, IPR2019-01094 filed May 17, 2019. 108 pages.
IPR2019-01094 Exhibit 1001. U.S. Pat. No. 9,964,266 ("the '266 Patent"). 14 pages.
IPR2019-01094 Exhibit 1002. Declaration of Eric Bretschneider, Ph.D. ("Bretschneider"). 107 pages.
IPR2019-01094 Exhibit 1003. Curriculum Vitae of Dr. Bretschneider. 11 pages.
IPR2019-01094 Exhibit 1004. Excerpts from the File History of U.S. Pat. No. 9,964,266. 105 pages.
IPR2019-01094 Exhibit 1005. Imtra 2011 Marine Lighting Catalog—Advanced LED Solutions ("Imtra 2011"). 40 pages.
IPR2019-01094 Exhibit 1006. Imtra 2007 Marine Lighting Catalog ("Imtra 2007"). 36 pages.
IPR2019-01094 Exhibit 1007. U.S. Pat. No. 9,366,418 ("Gifford"). 9 pages.
IPR2019-01094 Exhibit 1008. Declaration of Colby Chevalier ("Chevalier"). 89 pages.
IPR2019-01094 Exhibit 1009. U.S. Pat. No. 7,102,172 ("Lynch"). 41 pages.
IPR2019-01094 Exhibit 1010. Illuminating Engineering Society, ANSI RP-16-10, Nomenclature and Definitions for Illuminating Engineering (approved as an American National Standard Jul. 15, 2005, approved by the IES Board of Directors Oct. 15, 2005). 4 pages.
IPR2019-01094 Exhibit 1011. Underwriters Laboratories Inc. Standard for Safety, Standard UL-8750, entitled Light Emitting Diode (LED) Equipment for Use in Lighting (1st ed. 2009). 5 pages.
IPR2019-01094 Exhibit 1012. Celanese CoolPoly® D5502 Thermally Conductive Liquid Crystalline Polymer Specification ("CoolPoly"). 1 page.
IPR2019-01094 Exhibit 1013. Illuminating Engineering Society of North America, IES Lighting Handbook (John E. Kaufman and Howard Haynes eds., Application vol. 1981) ("Lighting Handbook"). 5 pages.
IPR2019-01094 Exhibit 1014. California Energy Commission, PIER Lighting Research Program: Project 2.3 Low-profile LED Luminaires Final Report (Prepared by Lighting Research Center, Jan. 2005) ("PIER LRP"). 70 pages.
IPR2019-01094 Exhibit 1015. Jim Sinopoli, Using DC Power to Save Energy and End the War on Currents, GreenBiz (Nov. 15, 2012), https://www.greenbiz.com/news/2012/11/15/using-dc-power-save-energy-end-war-currents ("Sinopoli"). 6 pages.
IPR2019-01094 Exhibit 1016. Robert W. Johnson, "Thought Leadership White Paper: AC Versus DC Power Distribution" (Nov. 2012) ("Johnson"). 10 pages.
IPR2019-01094 Exhibit 1017. Lumileds, LUXEON Rebel General Purpose Product Datasheet, Specification DS64 (2016) ("Luxeon Rebel"). 26 pages.
IPR2019-01094 Exhibit 1018. U.S. Pat. No. 8,454,204 ("Chang"). 11 pages.
IPR2019-01094 Exhibit 1019. U.S. Department of Energy, CALiPER Benchmark Report: Performance of Incandescent A-Type and Decorative Lamps and LED Replacements (prepared by Pacific National Laboratory, Nov. 2008) ("CALiPER 2008"). 25 pages.
IPR2019-01094 Exhibit 1020. U.S. Pat. No. 3,836,766 ("Auerbach"). 13 pages.
IPR2019-01094 Exhibit 1021. U.S. Department of Energy, CALiPER Application Summary Report 16: LED BR30 and R30 Lamps (prepared by Pacific Northwest National Laboratory, Jul. 2012) ("CALiPER 2012"). 26 pages.
IPR2019-01094 Exhibit 1022. Sandia National Laboratories, Sandia Report: "The Case for a National Research Program on Semiconductor Lighting" (Jul. 2000) ("Haitz"). 24 pages.
IPR2019-01094 Exhibit 1023. Sylvania, Post Top Street Light LED Retrofit Kit Specification, LED40POST (2009) ("Sylvania"). 4 pages.
IPR2019-01094 Exhibit 1024. Webster's New Collegiate Dictionary (1973) ("Webster's"). 2 pages.
IPR2019-01094 Exhibit 1025. 3M Wire Connectors and Tools Catalog 2013 ("3M Catalog"). 22 pages.
IPR2019-01094 Exhibit 1026. Wakefield Semiconductor Heat Sinks and Thermal Products 1974 Catalog ("Wakefield"). 3 pages.
IPR2019-01094 Exhibit 1027. U.S. Department of Energy, Solid-State Lighting Research and Development Portfolio: Multi-Year Program Plan FY'07-FY'12 (prepared by Navigant Consulting, Inc., Mar. 2006) ("DOE 2006"). 129 pages.
IPR2019-01094 Exhibit 1028. U.S. Department of Energy, Solid-State Lighting ResearA1023:C1043elopment: Multi-Year Program Plan (Apr. 2013) ("DOE 2013"). 89 pages.
Declaration of Colby Chevalier from Central District of California Civil Docket for Case #: 2:18-cv-07090-CAS-GJS filed Jun. 3, 2019, signed Jun. 3, 2019. 2 pages.
Docket Listing in Inter Partes Review of U.S. Pat. No. 9,964,266. Docket Navigator *AMP Plus, Inc. d/b/a Elco Lighting et al* v. *DMF, Inc.* PTAB-IPR2019-01094. Downloaded Mar. 25, 2020. 4 pages.
Petition for Inter Partes Review of U.S. Pat. No. 9,964,266 Pursuant to 37 C.F.R. § 42.100 et seq. *AMP Plus Inc. dbd ELCO Lighting* v. *DMF, Inc*, PTAB-IPR2019-01500 filed Aug. 14, 2019. 99 pages.
Docket Listing in Inter Partes Review of U.S. Pat. No. 9,964,266 . *AMP Plus, Inc. d/b/a ELCO Lighting et al* v. *DMF, Inc.* PTAB-IPR2019-01500. Downloaded Mar. 25, 2020. 3 pages.
Civil Action No. 2:18-cv-07090. Complaint For Infringement And Unfair Competition. *DMF, Inc.* v. *AMP Plus, Inc. d/b/a ELCO Lighting*. 52 pages. Dated Aug. 15, 2018.
Docket Listing in Civil Action No. 2:18-cv-07090. *DMF, Inc.* v. *AMP Plus, Inc. d/b/a ELCO Lighting et al* CDCA- 2-18-cv-07090. Downloaded on Mar. 25, 2020. 39 pages.
Civil Action No. 2:19-cv-4519.Complaint For Patent Infringement. *DMF, Inc.* v. *AMP Plus, Inc. d/b/a ELCO Lighting*. 23 pages dated May 22, 2019.
Docket Listing in Civil Action No. 2:19-cv-4519. *DMF Inc* v. *AMP Plus, Inc. d/b/a ELCO Lighting et al* CDCA-2-19-cv-04519. Downloaded on Mar. 25, 2020. 3 pages.
Decision Denying Institution of Inter Partes Review of U.S. Pat. No. 9,964,266 in IPR2019-01500 dated Mar. 17, 2020. 21 pages.
Defendants' Notice of Prior Art Pursuant To 35 U.S.C. § 282 in Civil Action No. 2:18-cv-07090-CAS-GJS dated Feb. 28, 2020. 7 pages.
Defendant AMP Plus, Inc.'s Opposition to DMF's Motion for Summary Judgement in Civil Action No. 2:18-cv-07090-CAS-GJS filed Feb. 10, 2020. 32 pages.
Declaration of Eric Bretschneider, Ph.D In Support of Amp Plus, Inc.'s Opposition to Dmf, Inc.'s Motion for Partial Summary Judgment in Civil Action No. 2:18-cv-07090-CAS-GJS filed Feb. 10, 2020. 210 pages.
Plaintiff DMF's Reply in Support Of Motion For Partial Summary Judgment in Civil Action No. 2:18-cv-07090-CAS-GJS filed Feb. 18, 2020. 33 pages.
Declaration of James R. Benya In Support of Plaintiff DMF's Motion for Summary Judgment in Civil Action No. 2:18-cv-07090-CAS-GJS filed Feb. 3, 2020. 193 pages.

(56) References Cited

OTHER PUBLICATIONS

Underwriters Laboratories Inc. Standard for Safely. UL 1598. Luminaires Feb. 11, 2020. 12 pages.
Exceptional LED Lighting Technology Product Portfolio. LightingScience 2012. 11 pages.
"Cree LMH2 LED Modules," Mouser Electronics. Sep. 9, 2012. 4 pages.
Slim Line Disc. EYE LEDs Specification Sheet 2012. 2 pages.
HiBay LED Heat Sink. Wakefield-vette. Dec. 11, 2017. 1 pages.
Thermal Management of Cree® XLamp® LEDs. Cree Application Note. 2004. 19 pages.
Imtra Marine Lighting Fall 2007 Catalog. 32 pages.
Cree LMH2 LED Modules Product Family Data Sheet. Cree 2011-2014, 18 pages.
Cree LMH2 LED Modules Design Guide. Cree 2011-2015, 23 pages.
Brochure of Elco EL49A, EL49ICA, EL49RA modules. ELCO Lighting Nov. 25, 2009. 1 page.
Image of Elco E347/247 module identified by Elco in response to DMF's Request for Production in Civil Action No. 2:18-cv-07090-CAS-GJS on Aug. 28, 2019. 1 page.
Screenshots from the Deposition of Brandon Cohen in Civil Action No. 2:18-cv-07090-CAS-GJS. Conducted Sep. 2, 2020. 8 pages.
Defendant AMP Plus, Inc.'s Initial Disclosure and Designation of Expert Witnesses in Civil Action No. 2:19-CV-4519-CAS dated Sep. 15, 2020, 37 pages.
Defendant AMP Plus, Inc. D/B/A Elco Lighting's Supplemental Responses to Plaintiff DMF, Inc.'s First Set of Interrogatories (Nos. 1-16) in C.A. No. 2:19-CV-4519-CAS, Redacted, dated Jul. 29, 2020. 13 pages.
Final Written Decision in IPR2019-01094 dated Nov. 19, 2020, 58 pages.
Opinion from the Fed. Ct. of App. in *AMP Plus, Inc.* v. *DMF, Inc.* in case Nos. 2021-1595, 2021-1636 (Appeals from the PTAB in IPR2019-01094) decided on Nov. 10, 2022, 15 pages.
Request for Ex Parte Reexamination of U.S. Pat. No. 10,663,127 filed Aug. 3, 2020, Reexam Control No. 90/014,557, 48 pages.
Notice of Streamlined Reexamination Request Filing Date in Reexam Control No. 90/014,557 dated Aug. 5, 2020, 2 page.
Ex Parte Reexamination Interview Summary in Reexam Control No. 90/014,557 dated Aug. 17, 2020, 3 pages.
DRD5S Surface Mount LED Downlight Vimeo Mar. 28, 2018. Accessed at https://vimeo.com/262251260. 4 pages.
Order Granting Request for Ex Parte Reexamination in Reexam Control No. 90/014,557 dated Aug. 25, 2020, 10 pages.
Request for Ex Parte Reexamination of U.S. Pat. No. 10,488,000 filed Oct. 30, 2020, Reexam Control No. 90/014,601, 27 pages.
Notice of Streamlined Reexamination Request Filing Date in Reexam Control No. 90/014,601 dated Nov. 4, 2020, 2 pages.
Order Granting Request for Ex Parte Reexamination in Reexam Control No. 90/014,601 dated Nov. 16, 2020, 11 pages.

* cited by examiner

LIGHTING ASSEMBLY WITH AC TO DC CONVERTER AND HEAT-SINKING HOUSING

CROSS-REFERENCE TO RELATED APPLICATION

This application is a continuation (CON) application of U.S. application Ser. No. 17/395,522, filed Aug. 6, 2021, which is a continuation (CON) application of U.S. application Ser. No. 17/080,080, filed Oct. 26, 2020, which is a continuation (CON) application of U.S. application Ser. No. 16/522,275, filed Jul. 25, 2019, which is a continuation (CON) of U.S. application Ser. No. 15/947,065, filed Apr. 6, 2018, which is a continuation (CON) application of U.S. application Ser. No. 14/184,601, filed Feb. 19, 2014, which claims the benefit of the earlier filing date of U.S. provisional application No. 61/843,278, filed Jul. 5, 2013. Each of the above-identified applications is incorporated herein by reference in its entirety.

FIELD

An embodiment relates to a compact recessed lighting system that includes a light source module and a driver in a single unified casting, which along with an optical light reflector shields the driver from exposure to outside elements and allows the recessed lighting system to be installed in a standard junction box. In some embodiments, this compact recessed lighting system may be utilized in 4-10" recessed new construction and remodel products and in retrofit applications. Moreover, in some embodiments, this compact recessed lighting system may be utilized with interchangeable trims to accommodate different aperture luminaires. Other embodiments are also described.

BACKGROUND

Recessed lighting systems are typically installed or mounted into an opening in a ceiling or a wall. Recessed lighting systems generally consist of a trim, a light source module, a driver, and a "can" housing. The driver is insulated from other portions and components of the recessed lighting system, including the light source module, through the use of a separate insulating container. The driver may be electrically coupled to the light source module through the use of wires or other conduits such that the driver may power the light source module to emit light.

The separation between the driver and the light source module adds to the combined size of the recessed lighting system. In particular, the use of a separate container that houses the driver separate from the other portions and components of the recessed lighting system, including the light source module, increases the size of the recessed lighting system. This increased size restricts the recessed lighting system to be placed in constrained spaces within a ceiling or a wall and may increase the overall cost of the recessed lighting system.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
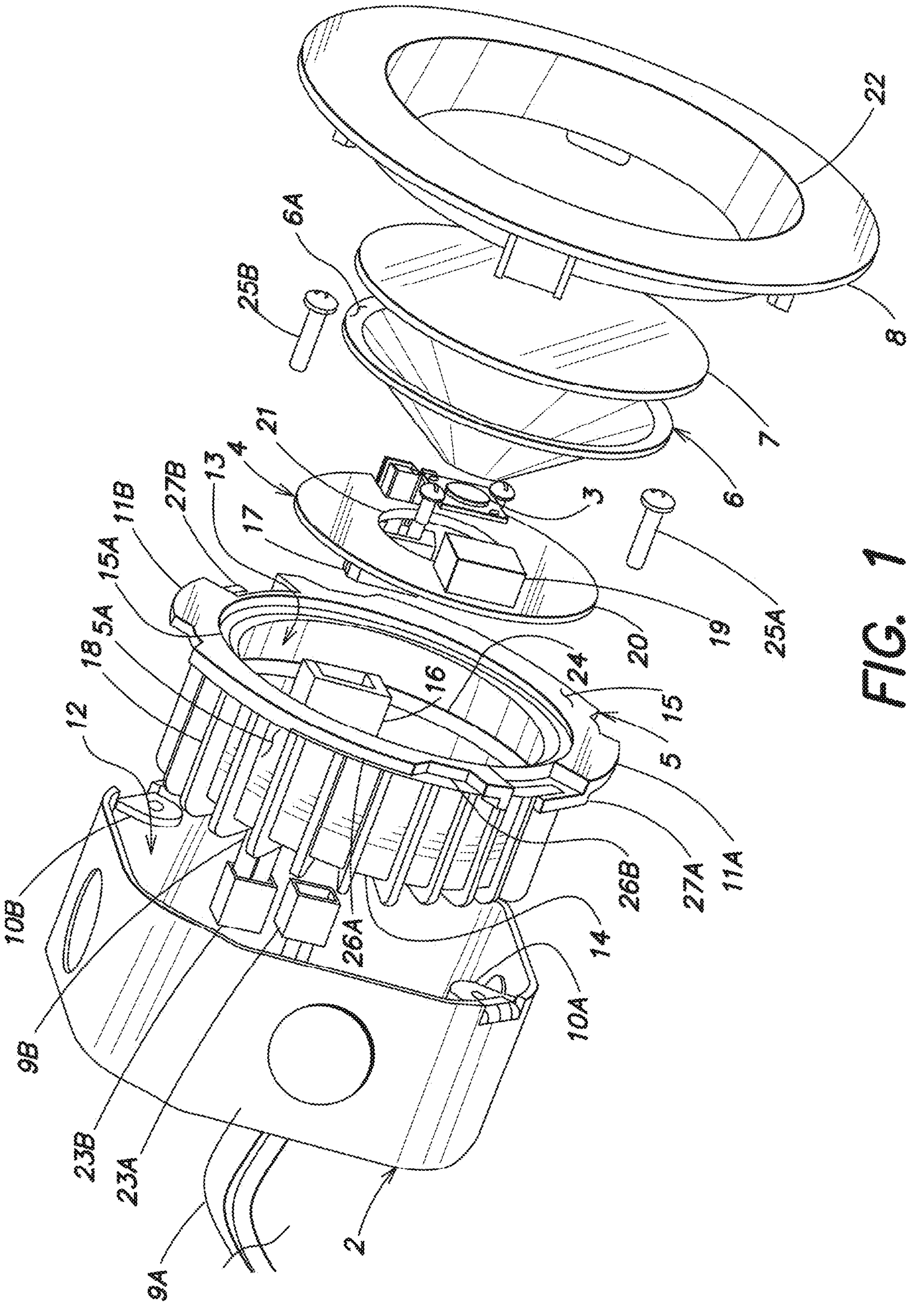
FIG. 1 shows an exploded view of a recessed lighting system according to one embodiment.

FIG. 1 shows an exploded view of a recessed lighting system 1. The recessed lighting system 1 may include a junction box 2, a light source module 3, a driver (e.g., a power supply) 4, a unified casting 5, a reflector 6, a lens 7, and a trim 8. As will be described in further detail below, the recessed lighting system 1 provides a more compact and cost effective design while complying with all building and safety codes/regulations. Although shown with a single junction box 2 and trim 8, the light source module 3, the driver 4, the unified casting 5, the reflector 6, and the lens 7 may be similarly used with different sized junction boxes 2 and trims 8. Each of the elements of the recessed lighting system 1 will be explained by way of example below.

The junction box 2 is a structure that separates the inner components of the recessed lighting system 1, including electrical wires/cables, from the items inside a ceiling or crawl space (e.g., insulation) in which the junction box 2 has been installed. In one embodiment, the junction box 2 is directly coupled to a stud, beam, or other structural member inside the ceiling or crawl space through the use of resins, clips, screws, bolts, clamps, or any other type of connecting mechanism. The junction box 2 may be equipped with one or more bar-hangers to assist installation when the junction box 2 needs to be located between two studs or joists. In one embodiment, the junction box 2 may be a single or double gang box with a fire rating of up to two hours as described in the National Electrical Code (NEC) and by the Underwriters Laboratories (UL). The junction box 2 may receive electrical wires 9A from an electrical system (e.g., 120 VAC or 277 VAC) within a building or structure in which the recessed lighting system 1 is installed. The electrical wires 9A from the structure may be connected to corresponding wires 9B of the unified casting 5, as will be described in greater detail below.

In one embodiment, the junction box 2 may include one or more tabs 10A, 10B for coupling the junction box 2 to the casting 5. The tabs 10A, 10B may be any device/component for receiving corresponding elements 27A, 27B of the casting 5 to firmly hold the weight of the unified casting 5, the light source module 3, the driver 4, the reflector 6, the lens 7, and/or the trim 8 up against the junction box 2. As shown in FIG. 1, the tabs 10A, 10B include holes for receiving screws or bolts 25A, 25B through the corresponding elements 27A, 27B; however, in other embodiments the tabs 10A, 10B may facilitate a twist-and-lock friction connection with corresponding elements 27A, 27B of the casting 5 and without the use of separate tools or other devices.

In still other embodiments, friction or tension clips may be utilized to couple the casting 5 to the junction box 2.

Figure 2:
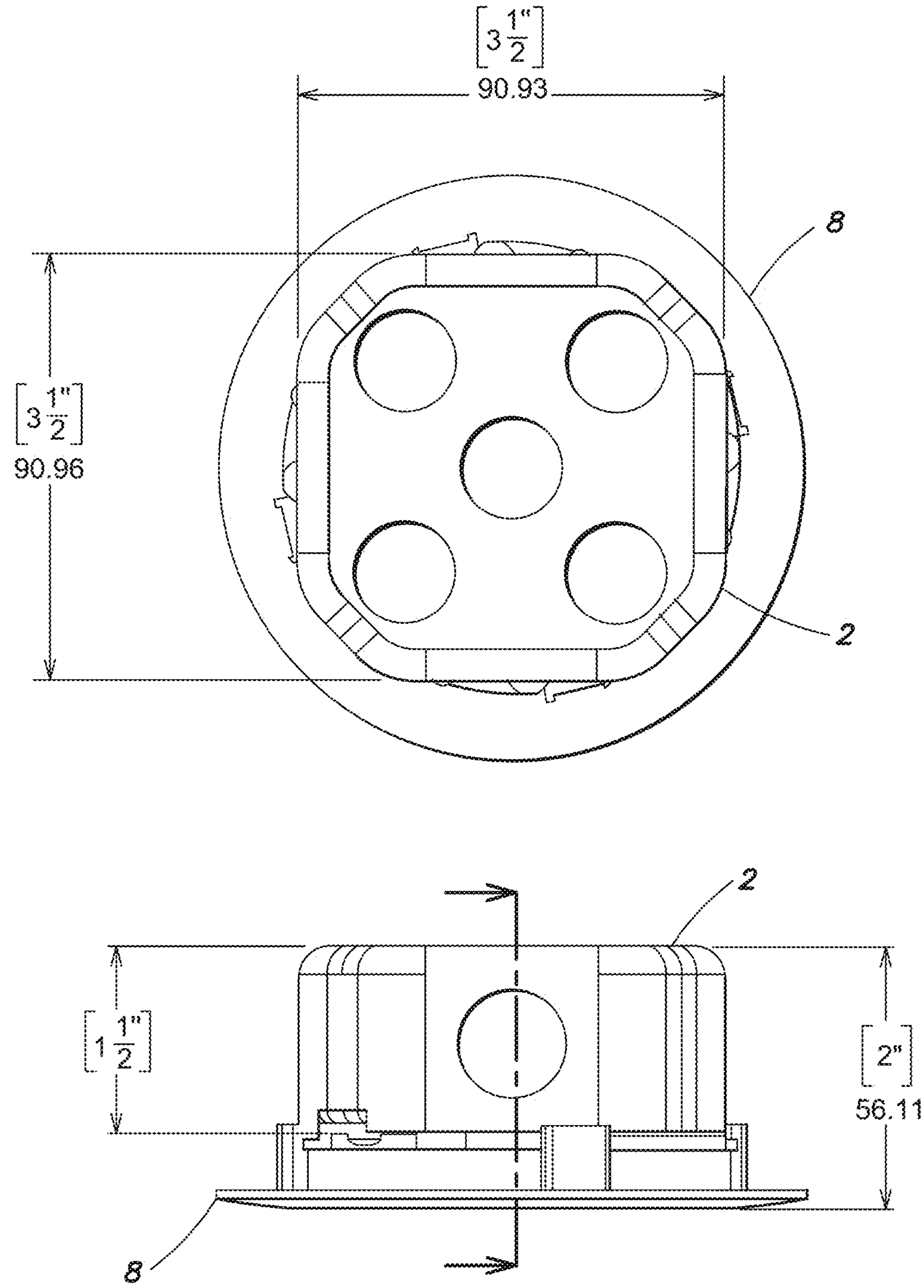
FIG. 2 shows top and side views of a junction box according to one embodiment.

In one embodiment, the junction box 2 acts as a heat barrier to block heat emitted by the light source module 3 and the driver 4 from reaching possibly flammable items inside a ceiling or crawl space. In these embodiments, the junction box 2 may be formed of metals, polymers, metal alloys, and/or other heat insulating materials. As shown in FIG. 1, the junction box 2 may be a polygon that defines a cavity 12 therein. However, in other embodiments, the junction box 2 may be any suitable shape, including an ellipsoid, cone, or cylinder that is capable of receiving therein the casting 5. The cavity 12 that is formed in the junction box 2 may be larger than the casting 5 such that the casting 5 may easily fit into the cavity 12 without coming into direct contact with the walls of the cavity 12. However, in other embodiments, the casting 5 may be sized to come into direct contact with the walls of the cavity 12. The size of the cavity 12 may be pursuant to popular industry specifications for junction boxes and in compliance with all applicable building and safety codes/regulations. For example, as shown in FIG. 2, the junction box 2 may have a length of 3½ inches, a width of 3½ inches and a depth of 1½ inches. When coupled together, the combined junction box 2, light source module 3, driver 4, casting 5, reflector 6, lens 7, and trim 8 may have a height/depth of 2 inches.

Figure 3:
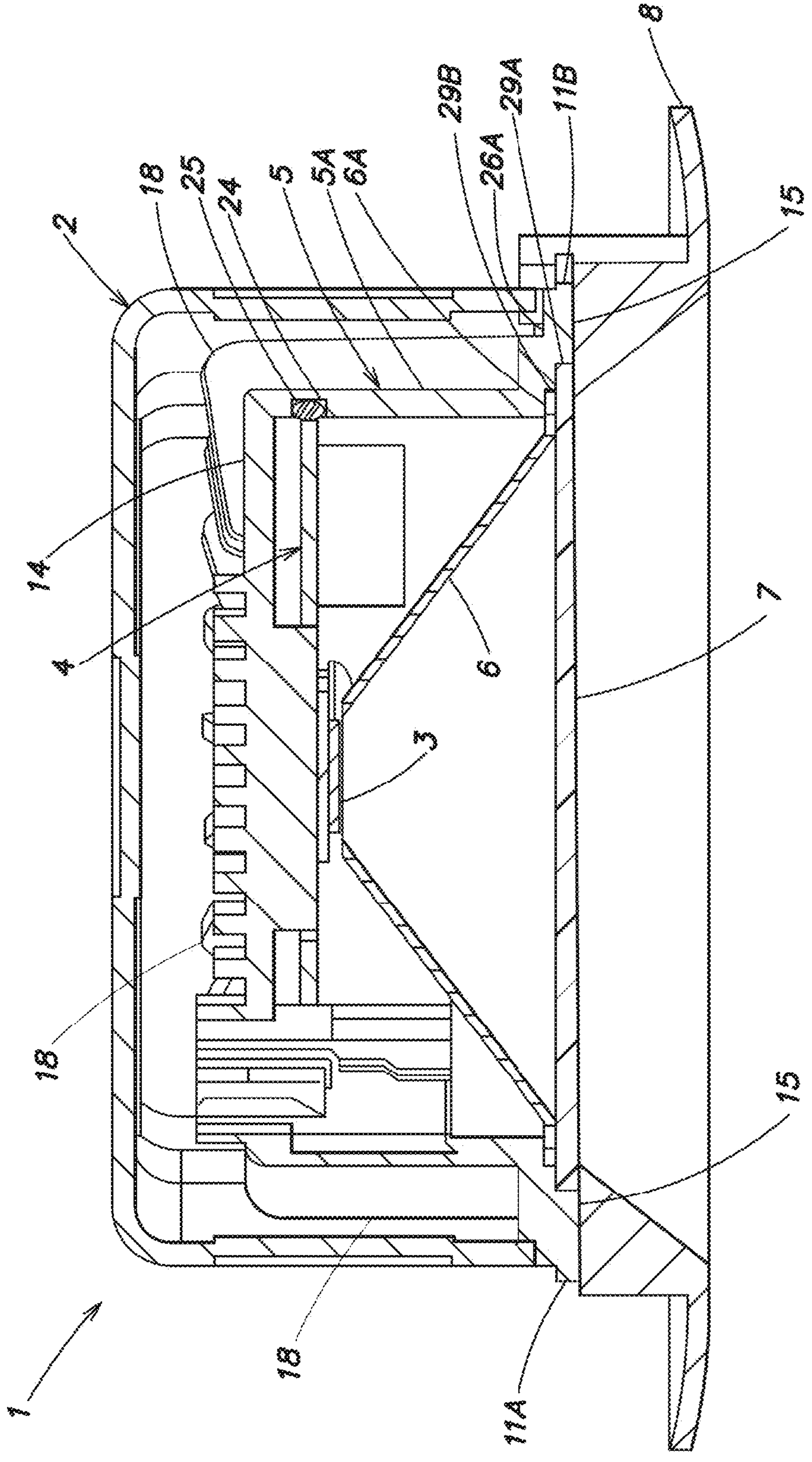
FIG. 3 shows a side view of the recessed lighting system according to one embodiment.

The junction box 2 is a shell and/or enclosure that further prevents the exposure of heat from the light source module 3 and the driver 4 to the items inside a ceiling or crawl space (e.g., insulation) in which the recessed lighting system 1 has been installed. The casting 5 may be formed of metals, polymers, metal alloys, and/or other materials. As shown in FIG. 1, the casting 5 may be a cylindrical structure that defines a casting cavity 13 therein. However, in other embodiments, the casting 5 may be any suitable shape, including an ellipsoid, cone, or polygon that is capable of housing the light source module 3 and the driver 4. As shown in FIGS. 1 and 3, the cavity 13 is to receive therein the light source module 3 and the driver 4.

In one embodiment, the casting 5 may include a closed rear face 14 and an open front face 15*a*. The closed rear face 14 allows the light source module 3 and the driver 4 to be securely mounted to the casting 5, while the open front face 15*a* provides an aperture to allow light emitted by the light source module 3 to be exposed to an outside environment surrounding the recessed lighting system 1 (e.g., into a room). In one embodiment, the rear face 14 of the casting 5 may include one or more mounting elements for receiving and securely holding the light source module 3 and the driver 4. In some embodiments, the mounting elements may be holes, flaps, or other structures designed to receive the light source module 3 and the driver 4. The mounting elements may be capable of receiving resins, clips, screws, bolts, clamps, or any other type of connecting mechanism such that the light source module 3 and the driver 4 may be securely coupled inside the cavity 13 on the rear face 14 of the casting 5. In one embodiment, the light source module 3 and the driver 4 are removably coupled to the casting 5 while in other embodiments one or more of the light source module 3 and the driver 4 form a single continuous and indivisible component with the casting 5.

Although described as a casting 5, the casting 5 may be formed through other processes other than casting techniques. For example, the casting 5 may be formed through an extrusion process or formed through the welding of metal sheets to form a structure. Further, although described as an enclosed assembly, the casting 5 may be any heat conducting structure to which the light source module 3 and the driver 4 are mounted and which can be mounted, using any type of fasteners or mounting elements, to the junction box 2.

In one embodiment, the electrical wires 9A received by the junction box 2 from the electrical system of a building or structure may be coupled to the electrical wires 9B of the casting 5. The electrical wires 9A may be coupled to the electrical wires 9B through the use of electrical caps or other devices. For example, as shown in FIG. 1, the electrical wires 9A and 9B may be connected using the connectors 23A and 23B. The connectors 23A and 23B are complimentary, keyed or interlocking connectors. The electrical wires 9B of the casting 2 may terminate in a connector holder 16 that may receive a corresponding connector 17 of the driver 4. In one embodiment, the connectors 16 and 17 are complimentary, keyed or interlocking connectors similar to the connectors 23A and 23B described above. When the connectors 16 and 17 are engaged, electricity may pass from the electrical system of the building or structure to the driver 4.

In one embodiment, the casting 5 includes one or more heat sinks 18 to dissipate heat generated by the light source module 3 and/or the driver 4. Although the heat sinks 18 are shown as passive components that cool the combined casting 5, light source module 3, and driver 4 by dissipating heat into the surrounding air, active heat sinks (e.g., fans) may also be used. In one embodiment, the heat sinks 18 are defined by a set of fins surrounding the casting 5. The heat sinks 18 may be composed of any thermally conductive material. For example, the heat sinks 18 may be made of aluminium alloys, copper, copper-tungsten pseudoalloy, AlSiC (silicon carbide in aluminium matrix), Dymalloy (diamond in copper-silver alloy matrix), E-Material (beryllium oxide in beryllium matrix), and/or thermally conductive plastics or ceramics.

As described above, the recessed lighting system 1 may include the driver 4. The driver 4 is an electronic device that supplies and/or regulates electrical energy to the light source module 3 and thus powers the light source module 3 to emit light. The driver 4 may be any type of power supply, including power supplies that deliver an alternating current (AC) or a direct current (DC) voltage to the light source module 3. In one embodiment, the driver 4 receives electricity from the casting 5 via a connector. In one embodiment, the connector 17 is coupled to the connector holder 16 of the casting 5 such that electrical wires are not protruding from the casting 5. In this embodiment, the supply connection from the driver 4 terminates in connector 17, which is force-fitted into connector holder 16. In another embodiment, the driver 4 may connect to the supply wires, 9A, via wire nuts.

Upon receiving electricity, the driver 4 may regulate current or voltage to supply a stable voltage or current within the operating parameters of the light source module 3. The driver 4 receives an input current from the electrical system of the building or structure in which the recessed lighting system 1 is installed and drops the voltage of the input current to an acceptable level for the light source module 3 (e.g., from 120V-240V to 36V-48V). The driver 4 may transfer electricity to the light source module 3 through an electrical connector. For example, the driver 4 may deliver electricity to the light source module 3 through an electrical cable coupled between the light source module 3 and the driver 4 through removable or permanent connectors or soldered leads originating from the driver 4. Although shown with magnetic transformer 19, the driver 4 may include additional circuitry for regulating current to the light source module 3.

As shown in FIG. 1, the driver 4 may also include the board 20 for holding the magnetic transformer 19 and other circuitry. In one embodiment, the board 20 is formed in a "donut", torus, or "C" shape with an opening 21. The outside edge of the board 20 is coupled to the casting 5, while the opening 21 formed by the board 20 allows the light source module 3 to be directly coupled to the casting 5 without coming into direct contact with the driver 4. By forming a structure with the opening 21, the driver 4 allows the light source module 3 to avoid the driver 4, eliminating shadows or interference from the driver 4, and allows the light source module 3 to directly contact the casting 5, assisting the casting 5 to dissipate heat generated by the light source module 3. This compact structure allows the light source module 3 and the driver 4 to be contained within the unified casting 5, which in turn may fit inside a standard junction box (i.e., junction box 2) and/or a 4-8 inch recessed lighting fixture (both incandescent and non-incandescent). Accordingly, the recessed lighting system 1 can operate without the use of a "can" housing structure. This simplified and more compact structure reduces the cost and complexity of installing the recessed lighting structure 1 into an existing/pre-installed junction box or a newly installed junction box. Further, this configuration allows the recessed lighting system 1 to achieve a UL fire-rating of at least two hours.

In one embodiment, the board 20 may be a printed circuit board. The driver 4 may be coupled to the casting 5 using any connecting mechanism, including resins, clips, screws, bolts, or clamps. For example, in one embodiment, the driver 4 may be coupled to the casting 5 using friction or tension clips.

The light source module 3 may be any electro-optical device or combination of devices for emitting light. For example, the light source module 3 may have as a single light source a light emitting diode (LED), organic light-emitting diode (OLED), or polymer light-emitting diode (PLED). In some embodiments, the light source module 3 may have multiple light sources (e.g., LEDs, OLEDs, and/or PLEDs). The light source module 3 receives electricity from the driver 4, as described above, such that the light source module 3 may emit a controlled beam of light into a room or surrounding area. The driver 4 is designed to ensure that the approximate voltage and current are fed to the light source module 3 to enable the emission of light by the one or more light sources within the light source module 3.

As described above and shown in FIG. 1, the light source module 3 is coupled to the casting 5 in the opening 21 formed by the board 20. As described above, by positioning the light source module 3 in the opening 21, the light source module 3 may avoid the driver 4, thus eliminating shadows or interference from the driver 4, and allowing the light source module 3 to directly contact the casting 5, such that the casting 5 can dissipate heat generated by the light source module 3. Further, this compact design allows the recessed lighting system 1 to utilize a standard sized junction box (e.g., junction box 2) instead of a "can" housing structure. As shown in FIG. 1, the light source module 3 is coupled to the casting 5 using screws; however, in other embodiments, the light source module 3 may be coupled to the casting 5 using any connecting mechanism, including resins, clips, screws, bolts, or clamps. For example, in one embodiment, the light source module 3 may be coupled to the casting 5 using friction or tension clips.

In one embodiment, the casting 5 may include an insulating gasket 25 that separates the board 20 and the casting 5. The insulating gasket 25 may be placed on a groove 24 that encircles the casting cavity 13 of the casting 5. The insulating gasket 25 may be formed of materials that provide some degree of malleability and/or flexibility such that the gasket 25 is able to deform and tightly fit within the groove 24, including any slight irregularities. For example, the insulating gasket 25 may be formed of plastic, rubber, metal, and/or ceramic materials. The insulating gasket 25 assists in insulating the driver 4 from the outside environment.

In some embodiments, the recessed lighting system 1 may include the reflector 6. The reflector 6 may surround the light source module 3 and/or a light source of the light source module 3 to adjust the way light emitted by the light source module 3 is focused inside a room or surrounding area. In one embodiment, the reflector 6 surrounds the light source module 3 and separates the light source module 3 from the driver 4. This separation allows light from the light source module 3 to be emitted into a room or surrounding area while further shielding the driver 4 from being exposed to the room or surrounding area. For example, in one embodiment, the reflector 6 and the casting 5 may be coupled together such that the combined assembly may create a sealed structure to shield the driver 4 from the outside environment and the light source module 3. By shielding the driver 4 from the outside environment, the reflector 6 reduces the risk of fire or other dangers and ensures the recessed lighting system 1 complies with building and safety codes/regulations. The reflector 6 may be formed of any fire retardant material, including steel, aluminum, metal alloys, calcium silicate, and other similar materials.

In one embodiment, the reflector 6 may be coupled to the casting 5 using screws, rivets or other fasteners. The reflector 6 may also be designed as a snap fit into the casting 5.

Although shown as conical, the reflector 6 may be formed in any shape that may direct and/or focus light. For example, the reflector 6 may be parabolic, spherical, or a frusto-conical shape that is positioned over the light source module 3 while shielding the driver 4. In one embodiment, the reflector 6 may be coated with a reflecting material or include one or more reflecting elements that assist in the adjustment of light emitted by the light source module 3. For example, the reflector 6 may be coated with a shiny enamel or include one or more mirrors or retroreflectors or a microcellular polyethylene terephthalate (MCPET) material to adjust the focus of light emitted by the light module 3. In other embodiments, the reflector 6 may include various other optic elements to assist in the focusing of light emitted by the light source module 3.

In one embodiment, the recessed lighting system 1 may include a lens 7. The lens 7 may be formed to converge or diverge light emitted by the light source module 3. The lens 7 may be a simple lens comprised of a single optical element or a compound lens comprised of an array of simple lenses (elements) with a common axis. In one embodiment, the lens 7 also provides a protective barrier for the light source module 3 and shields the light source module 3 from moisture or inclement weather. The lens 7 may also assist in the diffusion of light and increase the uniformity of light over the surface of the recessed lighting system 1. The lens 7 may be made of any at least partially transparent material, including glass and hard plastics. In one embodiment, the lens 7 and the reflector 6 are contained in a single indivisible unit to work in conjunction to focus and adjust light emitted by the light source module 3. In other embodiments, the lens 7 and the reflector 6 are separate, divisible elements as shown in FIG. 1.

In one embodiment, the recessed lighting system 1 may include a trim 8. The trim 8 serves the primary purpose of covering the exposed edge of the ceiling or wall where a hole is formed in which the recessed lighting system 1 resides while still allowing light from the light source module 3 to be emitted into a room through an aperture 22. In doing so, the trim 8 helps the recessed lighting system 1 appear seamlessly integrated into the ceiling or wall. In one embodiment, the trim 8 is capable of coupling to the casting 5 while in other embodiments the trim 8 is capable of coupling to the junction box 2. The trim 8 may couple to the casting 5 and/or the junction box 2 using any connecting mechanism, including resins, clips, screws, bolts, or clamps. In one embodiment, the trim 8 may include grooves and/or slots to couple to corresponding grooves 26A and/or slots 26B of the casting 5 and/or the junction box 2 using a twist-and-lock friction connection and without the use of separate tools or other devices.

In one embodiment, different diameter trims 8 may be capable of being coupled to the casting 5 and/or the junction box 2. The size and design of the trims 8 may depend on the size of the hole in which the recessed lighting system 1 has been fitted and that the trim 8 must conceal, as well as the aesthetic decisions of the consumer. The trims 8 may be made of aluminum plastic polymers, alloys, copper, copper-tungsten pseudoalloy, AlSiC (silicon carbide in aluminum matrix), Dymalloy (diamond in copper-silver alloy matrix), and E-Material (beryllium oxide in beryllium matrix).

As seen in FIG. 1 the casting or housing 5 also includes a side wall 5*a* which in the figure is seen to be generally cylindrical and terminates in a front end face 15 which encompasses a front aperture 15*a*. The side wall 5*a* is continuous with the rear wall 14 and with heat sink fins 18 formed integrally with the side and rear walls of the unitary casting.

As shown in FIG. 1 and in FIG. 2, a trim 8 is assembled and retained to housing 5 by interlocking with twist-and-lock flanges 11A, 11B formed integrally with housing 5. The two twist and lock flanges 11A, 11B are better seen in FIG. 1 to extend radially from diametrically opposite sides of the front end face 15 integrally with side wall 5*a* of housing 5, and the forward surfaces of the locking flanges 11A, 11B are seen to be flush with the front end face 15.

As best seen in FIG. 3 flanges 11A, 11B also are substantially coplanar with the lens 7 as well as coplanar with a first circular rabbet recess 29A defined along an inner edge of front end face 15 and containing the lens 7. Consequently, with the lens installed in the rabbet, the front or exterior surface of lens 7 and forward surfaces of the flanges 11A, 11B define a nearly planar front surface for the compact light.

The unitary structure of the housing 5 and the coplanar location of the trim interlocking flanges 11A, 11B allow a reduction in total height of the compact light as measured between lens 7 and rear wall 14. Such reduced height in turn facilitates installation of the light in a standard but relatively small junction box which already has received a sufficient fire rating, so that the compact light can be installed in a ceiling directly in a j-box without use of a "can", as has been explained previously herein, thus greatly simplifying installation of the compact light.

The rabbet may be a two step rabbet, as seen in FIGS. 1 and 3, such that the lens 7 is held in the larger diameter outer rabbet 29A and a rim 6*a* of reflector 6 is held in the smaller diameter inner rabbet 29B.

The invention claimed is:

1. A recessed lighting system, comprising:

a lighting assembly, comprising:

a light source module including at least one LED;

an AC to DC converter to receive an AC voltage of one of approximately 120 VAC or approximately 277 VAC and supply regulated electrical energy to power the light source module;

a heat-sinking housing comprising a plurality of heat sink fins, a closed rear wall, and a sidewall joined to the closed rear wall and extending 360 degrees around the central axis of the heat-sinking housing to define a housing cavity that extends forward from the closed rear wall and outward to the sidewall, the closed rear wall and the sidewall being formed of a heat conductive material to conduct heat generated by the light source module, the AC to DC converter being physically coupled to the heat-sinking housing using a connecting mechanism and insulated from the heat-sinking housing;

a plurality of electrical wires coupled to the AC to DC converter and passing through the closed rear wall of the heat-sinking housing; and a front end face, wherein:

the sidewall of the heat-sinking housing is coupled to the front end face;

the light source module is positioned inside the housing cavity closer to the closed rear wall than to a forward surface of the front end face;

the front end face further comprises a tool-less mating mechanism to facilitate coupling with a trim; and an outside width of the lighting assembly is less than 3½ inches and fits between multiple tabs of a standard junction box.

2. The lighting system of claim 1, further comprising the trim coupled to the front end face of the lighting assembly via the tool-less mating mechanism.

3. The lighting system of claim 2, wherein the trim includes clips adapted to couple the trim to a junction box.

4. The lighting system of claim 1, wherein the lighting assembly is adapted to be installed in a junction box that allows a ceiling to maintain a fire rating of up to two hours as described in the National Electric Code.

5. The lighting system of claim 1, wherein the closed rear wall and the sidewall of the lighting assembly are formed of aluminum.

6. The lighting system of claim 1, wherein:

the light source module directly contacts the heat-sinking housing; and the light source module does not directly contact the AC to DC converter.

7. The lighting system of claim 1, wherein the lighting assembly further comprises:

a lens positioned to direct light produced by the light source module out into an area surrounding the recessed lighting system; and a circular recess defined along an inner edge of the front end face to contain the lens.

8. The lighting system of claim 7, wherein at least a portion of a front surface of the lens and the forward surface of the front end face define a nearly planar front surface for the lighting assembly.

9. The lighting system of claim 1, wherein the AC to DC converter includes a circuit board contained in the housing cavity of the lighting assembly.

10. The lighting system of claim 1, further comprising an enclosure to contain the lighting assembly, wherein the enclosure comprises one of a standard junction box or a 4-10 inch recessed lighting fixture.

* * * * *